United States Patent
Wei et al.

(10) Patent No.: US 10,064,193 B2
(45) Date of Patent: Aug. 28, 2018

(54) METHOD, BASE STATION AND USER EQUIPMENT FOR ADAPTING DEVICE-TO-DEVICE RESOURCE ALLOCATION

(71) Applicant: Sony Corporation, Tokyo (JP)

(72) Inventors: Na Wei, Beijing (CN); Dahai Liu, Beijing (CN)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/108,791

(22) PCT Filed: Apr. 22, 2014

(86) PCT No.: PCT/IB2014/060886
§ 371 (c)(1),
(2) Date: Jun. 29, 2016

(87) PCT Pub. No.: WO2015/101843
PCT Pub. Date: Jul. 9, 2015

(65) Prior Publication Data
US 2016/0323870 A1  Nov. 3, 2016

(30) Foreign Application Priority Data

Dec. 30, 2013  (CN) .......................... 2013 1 0744291

(51) Int. Cl.
| | | |
|---|---|---|
| H04W 4/00 | (2018.01) | |
| H04W 72/04 | (2009.01) | |
| H04W 8/00 | (2009.01) | |
| H04W 48/08 | (2009.01) | |
| H04L 5/00 | (2006.01) | |

(Continued)

(52) U.S. Cl.
CPC ......... *H04W 72/048* (2013.01); *H04L 5/0032* (2013.01); *H04W 8/005* (2013.01);
(Continued)

(58) Field of Classification Search
None
See application file for complete search history.

(56) References Cited

U.S. PATENT DOCUMENTS

| | | |
|---|---|---|
| 2010/0128695 A1 | 5/2010 | Nagaraja |
| 2012/0093098 A1 | 4/2012 | Charbit et al. |

(Continued)

FOREIGN PATENT DOCUMENTS

| | | |
|---|---|---|
| CN | 102246575 A | 11/2011 |
| CN | 102334370 A | 1/2012 |
| WO | 2013/012241 | 1/2013 |
| WO | 2013/177447 | 11/2013 |

OTHER PUBLICATIONS

International Search Report and Written Opinion from corresponding International Application No. PCT/IB2014/060886, dated Sep. 4, 2014.

(Continued)

*Primary Examiner* — Suhail Khan
(74) *Attorney, Agent, or Firm* — Renner, Otto, Boiselle & Sklar

(57) ABSTRACT

To allocate resources for a device-to-device discovery and/or communication to at least one user equipment of a mobile communication network, the at least one user equipment is informed of a change of the resources allocated for the device-to-device discovery and/or communication from first allocated resources to second allocated resources. To inform the at least one user equipment of the change, a base station or a user equipment which act as central controller for a group of users of the mobile communication network transmits information on the second allocated resources in at least one physical resource element of the first allocated resources.

28 Claims, 12 Drawing Sheets

(51) Int. Cl.
  *H04W 76/23* (2018.01)
  *H04W 76/14* (2018.01)
  *H04W 92/18* (2009.01)
  *H04W 88/06* (2009.01)
  *H04W 88/10* (2009.01)

(52) U.S. Cl.
  CPC ......... *H04W 48/08* (2013.01); *H04W 72/042* (2013.01); *H04W 76/14* (2018.02); *H04W 76/23* (2018.02); *H04W 88/06* (2013.01); *H04W 88/10* (2013.01); *H04W 92/18* (2013.01)

(56) References Cited

U.S. PATENT DOCUMENTS

| | | |
|---|---|---|
| 2012/0106517 A1 | 5/2012 | Charbit et al. |
| 2013/0084914 A1 | 4/2013 | Wu et al. |
| 2014/0235234 A1 | 8/2014 | Jang et al. |
| 2014/0328329 A1* | 11/2014 | Novlan ............... H04W 72/042 370/336 |

OTHER PUBLICATIONS

3GPP TS 25.331 V11.4.0 (Dec. 2012). 3rd Generation Partnership Project; Technical Specification Group Radio Access Network; Radio Resource Control (RRC); Protocol specification (Release 11).
3GPP TS 36.331 V11.2.0 (Dec. 2012). 3rd Generation Partnership Project; Technical Specification Group Radio Access Network; Evolved Universal Terrestrial Radio Access (E-UTRA); Radio Resource Control (RRC); Protocol specification (Release 11).

* cited by examiner

METHOD, BASE STATION AND USER EQUIPMENT FOR ADAPTING DEVICE-TO-DEVICE RESOURCE ALLOCATION

TECHNICAL FIELD

Embodiments of the invention relate to mobile communication systems. Embodiments of the invention relate in particular to techniques for allocating resources for device-to-device discovery and/or device-to-device communication in mobile communication networks.

BACKGROUND ART

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. For illustration, if a user equipment indicates an emergency call situation, another user equipment may provide repeater function to ensure good network coverage for the user equipment. Direct data or voice communication between user equipments is another example for use cases of D2D communication. For illustration, ProSe enabled user equipments located in proximity to each other may engage in data or voice communication. The respective D2D communication is not transmitted to the radio access network of the mobile communication network.

In order to perform D2D communication, a user equipment must be capable of detecting one or several other user equipments which are located in proximity to the user equipment. The resources, e.g. the subcarrier frequencies, slots and/or symbols which the user equipment may use for the device-to-device discovery may be allocated to the user equipment by a base station. The base station may allocate resources for the device-to-device discovery and/or for the device-to-device communication by broadcasting system information or by performing a Radio Resource Control, RRC, signaling, for example.

It may be required that the resource allocation is changed. For illustration, when the number of user equipments in the coverage area of a base station increases, it may be desired to adapt the resources allocated for the device-to-device discovery and/or for the device-to-device communication to ensure that the device-to-device discovery and/or the device-to-device communication does not severely affect the communication between the user equipments and the radio access network. It is a challenge to inform the user equipment(s) of a change in resource allocation in an efficient way. For illustration, if the information on the change in resource allocation were always transmitted in a system information block message, the system information block message would be processed also by user equipments which are not ProSe-enabled, causing processing overheads. If the information on the change in resource allocation were transmitted in RRC signaling, this would increase the traffic load on the air interface of the radio access network.

SUMMARY

There is a need in the art for techniques which allow resources for device-to-device discovery and/or device-to-device communication to be adjusted. There is in particular a need for such techniques which do not lead to a significant increase of the processing load of user equipments which are not capable of performing device-to-device discovery and/or device-to-device communication.

According to exemplary embodiments of the invention, a method, a base station, a user equipment, and a communication system are provided. When the resources allocated for device-to-device discovery and/or for device-to-device communication are to be changed, e.g. from current allocated resources to updated allocated resources, information on the updated allocated resources may be transmitted in at least one resource element of the current allocated resources for the device-to-device discovery and/or the device-to-device communication. In the following description and the appended claims, the term "first allocated resources" will be used to refer to the resources allocated for the device-to-device discovery and/or for the device-to-device communication before the change in the allocated resources takes place, and the term "second allocated resources" will be used to refer to the resources allocated for the device-to-device discovery and/or for the device-to-device communication after the change in the allocated resources takes place.

A method according to an embodiment is used for allocating resources for a device-to-device discovery to at least one user equipment of a mobile communication network. In the method, the at least one user equipment is informed that the resources allocated for the device-to-device discovery and/or for the device-to-device communication are changed from first allocated resources to second allocated resources. To inform the at least one user equipment of the change, a base station, a repeater relay or another user equipment of the mobile communication network transmits information on the second allocated resources in at least one physical resource element of the first allocated resources.

Because the information on the second allocated resources is transmitted in the at least one physical resource element of the first allocated resources, i.e. of the resources allocated for the device-to-device discovery, a user equipment which is not capable of performing device-to-device discovery and device-to-device communication does not process this information. This reduces the processing loads in user equipments which are not configured to perform device-to-device communication. Unnecessary processing of the information on the second allocated resources by user equipments which are not capable of performing device-to-device communication can be avoided.

The information on the second allocated resources may be transmitted by a base station. The information on the second allocated resources may alternatively or additionally be transmitted by a repeater relay or another user equipment.

The at least one physical resource element may have a fixed location in a physical resource block of the first allocated resources. This facilitates monitoring and retrieval of the information by the at least one user equipment.

The at least one physical resource element may have a fixed location which is defined by a fixed time offset and/or a fixed frequency offset relative to a synchronization signal, e.g. a synchronization signal transmitted by a base station.

The first allocated resources may be first allocated periodic resources. The second allocated resources may be second allocated periodic resources. This allows the device-to-device discovery and/or the device-to-device communication to be performed periodically by a user equipment.

The at least one physical resource element in which the information on the second allocated resources is transmitted may have the same location in at least two physical resource blocks of the first allocated periodic resources. This facilitates monitoring and retrieval of the information by the at least one user equipment.

One physical resource block of the at least two physical resource blocks and another physical resource block of the at least two physical resource blocks may be transmitted time-sequentially. The one physical resource block and the other physical resource block may be separated by a time gap. Thereby, the frequencies which are allocated for the device-to-device discovery and/or for the device-to-device communication in certain slots may be used for conventional uplink communication with the radio access network in the time gap.

The information on the second allocated resources may be distributed over the at least two physical resource blocks. This reduces the physical resource elements which are reserved for transmitting the information on the second allocated resources in each of the physical resource blocks. More physical resource elements remain available for the device-to-device discovery and/or the device-to-device communication. The risk of interference may be mitigated.

The information on the second allocated resources may be included several times in the at least two physical resource blocks. For illustration, the information on the second allocated resources may be included in one physical resource block and may be repeated in another physical resource block of the first allocated resources. The redundancy reduces the risk that a user equipment decodes the information on the second allocated resources incorrectly.

The information on the second allocated resources may determine a size of the second allocated resources. This allows the size of the resources allocated for the device-to-device discovery to be easily adjusted. The base station or a repeater relay can change the number of slots and/or the number of orthogonal frequency division multiplexing (OFDM) symbols and/or the number of subcarriers which are allocated for the device-to-device discovery by including the information in at least one physical resource element of the first allocated resources.

The at least one user equipment may comprise a plurality of user equipments which monitor the at least one physical resource element. The base station can thereby inform several user equipments or even all ProSe-enabled user equipments in its coverage area of the change in the resources allocated for device-to-device discovery. The transmission of the information on the second allocated resources may be simultaneously received and processed by all UEs capable of performing device-to-device discovery and located in the coverage area of the base station, or at least by a group of the UEs.

The first allocated resources may be used for a first allocation period. The at least one user equipment may start using the second allocated resources for the device-to-device discovery upon expiry of the first allocation period. Parameters for the allocated resources for the device-to-device discovery may always remain invariant for an allocation period, which can also be referred to as change cycle in the art. The transition to the second allocated resources may be made automatically and may be triggered by the expiry of the first allocation period.

The base station, a repeater relay or another user equipment may transmit information on the first allocation period to the at least one user equipment in a system information block of a system information message. This allows the first allocation period to be provisioned in a flexible way by the base station.

The base station, a repeater relay or another user equipment may transmit additional information on the second allocated resources in a system information block of a system information message. The additional information on the second allocated resources in the system information block of the system information message may be performed selectively, e.g. only when certain parameters of the allocated resources are changed. The transmission of the additional information in the system information block of the system information message provides increased flexibility to adapt parameters of the allocated resources which do not change very frequently.

The additional information on the second allocated resources may include a second allocation period for the second allocated resources. The second allocation period may be transmitted as the additional information only if the second allocation period is different from the first allocation period. Thereby, the amount of system information messages which needs to be transmitted to adjust the resources for the device-to-device discovery may be kept small.

The at least one user equipment may be configured to perform the device-to-device discovery and the device-to-device communication. The information on the second allocated resources transmitted in the at least one physical resource element of the first allocated resources may be processed only by the at least one user equipment which is configured to perform the device-to-device discovery and the device-to-device communication. Other user equipments which are located in the coverage area of the base station and which are not capable of performing device-to-device discovery and device-to-device communication may not process the at least one physical resource element of the first allocated resources. This reduces processing loads for user equipments which are not ProSe-enabled.

The base station may be an evolved NodeB (eNodeB). The base station and the at least one user equipment may be configured to communicate over an evolved UTRA (E-UTRA) air interface with each other. The at least one user equipment may use the same wireless interface for the device-to-device discovery, for device-to-device communication and for monitoring the information on the second allocated resources included in the physical resource element(s) of the first allocated resources.

According to another embodiment, a base station is provided. The base station comprises a wireless interface and a control device. The control device may be configured to control the wireless interface to allocate resources for a device-to-device discovery and/or for a device-to-device communication to at least one user equipment of a mobile communication network. The control device may be configured to inform the at least one user equipment of a change of the resources allocated for the device-to-device discovery and/or for the device-to-device communication from first allocated resources to second allocated resources by controlling the wireless interface to transmit information on the second allocated resources in at least one physical resource element of the first allocated resources.

By transmitting the information on the second allocated resources in at least one physical resource element of the first allocated resources, spurious processing of the information by non-ProSe-enabled user equipments may be avoided.

The control device may be configured to control the wireless interface such that the at least one physical resource element has a fixed location in a physical resource block of the first allocated resources. This facilitates detection of the change of the allocated resources by the at least one user equipment.

The control device may be configured to control the wireless interface such that the at least one physical resource element has a fixed location which is defined by a fixed time offset and/or a fixed frequency offset relative to a synchronization signal, e.g. a synchronization signal transmitted by the base station.

The base station may be configured such that the first allocated resources may be first allocated periodic resources. The base station may be configured such that the second allocated resources may be second allocated periodic resources. This allows the device-to-device discovery and/or the device-to-device communication to be performed periodically by a user equipment.

The base station may be configured such that the at least one physical resource element in which the information on the second allocated resources is transmitted may have the same location in at least two physical resource blocks of the first allocated periodic resources. This facilitates monitoring and retrieval of the information by the at least one user equipment.

The control device may be configured to control the wireless interface such that one physical resource block of the at least two physical resource blocks and another physical resource block of the at least two physical resource blocks are transmitted time-sequentially. The one physical resource block and the other physical resource block may be separated by a time gap. Thereby, the frequencies which are allocated for device-to-device discovery and/or for the device-to-device communication in certain slots may be used for conventional uplink communication with the radio access network in the time gap.

The control device may be configured to control the wireless interface such that the information on the second allocated resources is distributed over the at least two physical resource blocks. This reduces the physical resource elements which are reserved for transmitting the information on the second allocated resources in each of the physical resource blocks. More physical resource elements remain available for the device-to-device discovery and/or for the device-to-device communication. Interference problems may be mitigated.

The control device may be configured to control the wireless interface such that the information on the second allocated resources is included several times in the at least two physical resource blocks. For illustration, the information on the second allocated resources may be included in one physical resource block and may be repeated in another physical resource block of the first allocated resources. The redundancy reduces the risk that a user equipment decodes the information on the second allocated resources incorrectly.

The control device may be configured to control the wireless interface such that the information on the second allocated resources determines a size of the second allocated resources. This allows the size of the resources allocated for the device-to-device discovery to be easily adapted. The base station can change the number of slots and/or the number of orthogonal frequency division multiplexing (OFDM) symbols and/or the number of subcarriers which are allocated for the device-to-device discovery by including the information in at least one physical resource element of the first allocated resources.

The control device may be configured to control the wireless interface to transmit information on the first allocation period to the at least one user equipment in a system information block of a system information message. This provides enhanced flexibility in provisioning the first allocation period in the at least one user equipment.

The control device may be configured to control the wireless interface to transmit additional information on the second allocated resources in a system information block of a system information message. The additional information may include information on a second allocation period for which the parameters of the second allocated resources remain unchanged.

The base station may be an eNodeB.

According to another embodiment, a user equipment is provided which comprises a wireless interface for communication with a mobile communication network and a processing device coupled to the wireless interface. The processing device may be configured to control the wireless interface to perform a device-to-device discovery and/or a device-to-device communication using first allocated resources. The processing device may be configured to monitor at least one physical resource element of the first allocated resources using the wireless interface to detect that resources allocated for the device-to-device discovery and/or for the device-to-device communication are changed from the first allocated resources to second allocated resources.

The user equipment can detect information on a change of the resources allocated for the device-to-device discovery by monitoring the first allocated resources which need to be monitored for the device-to-device discovery at any rate.

The processing device may be configured such that the at least one monitored physical resource element has a fixed location in a physical resource block of the first allocated resources. This facilitates detection that the resources allocated for the device-to-device discovery will change.

The first allocated resources may be first allocated periodic resources. The second allocated resources may be second allocated periodic resources.

The monitored at least one physical resource element may have the same location in at least two physical resource blocks of the first allocated periodic resources.

The processing device may be configured to retrieve information included in the monitored at least one physical resource element to determine at least one parameter of the second allocated resources. The at least one parameter may define a size of the second allocated resources, e.g. a number of slots and/or OFDM symbols and/or subcarriers allocated for the device-to-device discovery in the second allocated resources.

The processing device may be configured to process a system information block of the system information message received by the wireless interface to determine at least one further parameter of the second allocated resources. The at least one further parameter may define a second allocation period. The processing device may be configured to use the second allocated resources for device-to-device discovery until the second allocation period expires.

The user equipment may monitor an expiry of a first allocation period and may start to automatically use the second allocated resources. The user equipment may receive the first allocated period in a system information message from a base station.

The wireless interface may be configured both for communication with a base station of the mobile communication network and for device-to-device communication with other user equipments.

According to another embodiment, a mobile communication system is provided which comprises a base station according to an embodiment and at least one user equipment according to an embodiment.

In the methods, devices, and systems according to embodiments, the first allocated resources may be periodic uplink resources. The periodic uplink resources may be allocated in a semi-static manner. The periodic uplink resources may be divided into time-frequency resources. The periodic uplink resources may be divided into time-frequency resources according to frequency division multiplexing (FDM) and/or time division multiplexing (TDM).

In the methods, devices, and systems according to embodiments, the second allocated resources may be other periodic uplink resources. The other periodic uplink resources may be allocated in a semi-static manner. The other periodic uplink resources may be divided into time-frequency resources. The other periodic uplink resources may be divided into time-frequency resources according to frequency division multiplexing (FDM) and/or time division multiplexing (TDM).

In the methods, devices, and systems according to embodiments, a user equipment which is capable of performing device-to-device discovery may perform the device-to-device discovery and device-to-device communication over the same wireless interface over which it transmits and/or receives signals from a radio access network of the mobile communication network.

In the methods, devices, and systems according to embodiments, information on persistent or slowly changing parameters of the resources allocated for the device-to-device discovery and/or the device-to-device communication may be sent in a system information block of a system information message. Alternatively, the information on persistent parameters may be fixed and may be defined by a specification, for example. Examples for such additional information on the second allocated resources include the position of the at least one physical resource element and a discovery resource change cycle length, for example.

The methods, devices, and systems according to various embodiments provide a mechanism which allows a base station to allocate resources for device-to-device discovery to one or several user equipments, while reducing the processing loads imposed on non-ProSe-enabled user equipments.

Although specific features described in the above summary and the following detailed description are described in the context of specific embodiments and aspects of the invention, the features of the embodiments and aspects may be combined with each other unless specifically noted otherwise.

BRIEF DESCRIPTION OF DRAWINGS

Embodiments of invention will now be described in more detail with reference to the accompanying drawings in which like or identical reference numerals designate like or identical elements.

DESCRIPTION OF EMBODIMENTS

Figure 1:
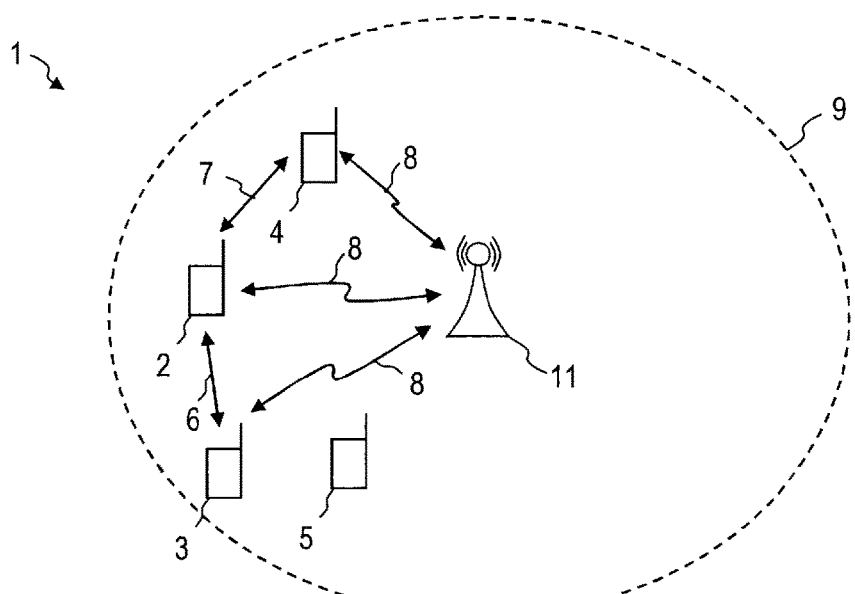
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) communication, it is to be understood that the techniques for D2D discovery and D2D communication may be used for a wide variety of use cases, including public safety use cases and other commercial use cases. While exemplary embodiments will be described in the context of certain cellular mobile communication networks, e.g. Long Term Evolution (LTE) networks, the embodiments are not described to such mobile communication techniques.

While exemplary embodiments will be described with reference to a base station which transmits information on a change in allocated resources, it is to be understood that a user equipment may receive information on the change in allocated resources also from a repeater relay or another user equipment, for example.

FIG. 1 shows a communication system 1 according to an embodiment. The communication system 1 includes a mobile communication system which is configured as a cellular wireless communication network. The cellular wireless communication network may comprise a plurality of base stations. One of the base stations is shown as base station 11 in FIG. 1. The base stations may communicate with each other via wireless radio communications or via an operator core network. The a cellular wireless communication network may be a Long Term Evolution (LTE) network. A radio access network (RAN) of the cellular wireless communication network may be an evolved UTRAN (E-UTRAN), with the base station 11 being an evolved Node B (eNodeB). The base station 11 may be connected to a Mobility Management Entity (MME) and/or Serving Gateway (S-GW) in the operator core network.

The base station 11 provides a radio cell 9 in which user equipments (UEs) 2, 3, 4, 5 may communicate directly with the base station 11 via radio frequency communication. The UEs 2, 3, 4, 5 may respectively have a wireless interface for communication with the E-UTRAN.

At least one of the UEs 2, 3, 4, 5 is capable of performing a D2D discovery for D2D communication. According to the terminology in the pertinent field of the art, the term D2D communication refers to a radio communication between UEs which is performed directly between the UEs. The radio signals transmitted in the D2D communication may not be processed by the base station 11. The radio signals transmitted in the D2D communication may not pass the RAN of the communication network. The radio signals transmitted in the D2D communication may not be processed by a core network of the wireless cellular communication network. The UEs which are configured for D2D communication may use the same wireless interface for communicating with the RAN and for D2D communication.

In order to identify suitable communication partners for D2D communication, a UE capable of performing D2D communication may be configured to perform a D2D discovery. In the D2D discovery, a UE may discover at least one further UE located in proximity of the UE and configured to engage in D2D communication with the UE. The D2D discovery may include a radio signaling between UEs which is performed directly between the UEs. The radio signals transmitted in the D2D discovery may not be processed by the base station 11. The radio signals transmitted in the D2D discovery may not pass through the RAN of the communication network. The radio signals transmitted in the D2D discovery may not be processed by a core network of the wireless cellular communication network. The UEs which are configured for D2D communication may use the same wireless interface for communicating with the RAN and for D2D discovery.

A UE configured for D2D discovery and D2D communication may also be referred to as Proximity Service (ProSe)-enabled UE in the art.

Not all UEs communicating with the wireless cellular communication network need to be configured for D2D discovery and D2D communication. For illustration, one UE or several UEs 2, 3, 4 located in the coverage area 9 of the base station 11 may be configured for D2D discovery and D2D communication. The UEs 2, 3 may transmit and receive radio signals 6 to perform a D2D discovery. The radio signals 6 do not pass through the RAN of the wireless cellular communication network. The UEs 2, 4 may transmit and receive radio signals 7 to perform a D2D discovery. The radio signals 7 do not pass through the RAN of the wireless cellular communication network. Another UE, e.g. UE 5, may not be configured for D2D discovery. Such a UE 5 is also referred to as non-ProSe-enabled UE in the art.

The UEs 2, 3, 4 which are configured for D2D communication may use allocated resources for the D2D discovery. The allocated resources for the D2D discovery may be allocated to the UEs 2, 3, 4 by the base station 11. The allocated resources may respectively be allocated by the base station 11 in a semi-static manner. The allocated resources may be periodic uplink resources. The allocated resources may be divided in the time domain, e.g. according to time division multiplexing (TDM), and/or in the frequency domain, e.g. according to frequency division multiplexing (FDM). The UEs 2, 3, 4 may use at least one physical resource block for the D2D discovery which would otherwise be used for uplink communication.

The base station 11 may be configured to allocate the resources for the D2D discovery by informing the UEs 2, 3, 4 in the coverage area 9 of the allocated resources. For illustration, when a UE 2, 3, 4 attaches to the base station 11 or enters the coverage area 9, the base station 11 may perform a Radio Resource Control (RRC) signaling to inform the respective UE 2, 3, 4 of the resources that are presently being allocated for the D2D discovery and/or for the D2D communication in the coverage area 9. Alternatively or additionally, information on at least one parameter of the resources that are presently being allocated for the D2D discovery and/or for the D2D communication may be broadcast by the base station 11 in a system information block (SIB) of a system information message (SIM). The base station 11 may be configured to transmit the information on at least one parameter of the resources that are presently being allocated for the D2D discovery and/or for the D2D communication in a system information message as defined in technical specification 3GPP TS 25.331, entitled "3rd Generation Partnership Project; Technical Specification Group Radio Access Network; Radio Resource Control (RRC); Protocol specification (Release 11)". The base station 11 may be configured to transmit the information on the at least one parameter of the resources that are presently being allocated for the D2D discovery and/or for the D2D communication in a system information message as defined in chapter 10.2.48 of technical specification 3GPP TS 25.331 V11.7.0 (2013-09), entitled "3rd Generation Partnership Project; Technical Specification Group Radio Access Network; Radio Resource Control (RRC); Protocol specification (Release 11)". The base station 11 may be configured to transmit the information on the at least one parameter of the resources that are presently being allocated for the D2D discovery and/or for the D2D communication in a system information message as defined in technical specification 3GPP TS 36.331, entitled "3rd Generation Partnership Project; Technical Specification Group Radio Access Network; Evolved Universal Terrestrial Radio Access (E-UTRA); Radio Resource Control (RRC); Protocol specification (Release 11)". The base station 11 may be configured to transmit the information on the at least one parameter of the resources that are presently being allocated for the D2D discovery and/or for the D2D communication in a system information message as defined in chapter 5.2.2 of technical specification 3GPP TS 36.331 V11.5.0 (2013-09), entitled "3rd Generation Partnership Project; Technical Specification Group Radio Access Network; Evolved Universal Terrestrial Radio Access (E-UTRA); Radio Resource Control (RRC); Protocol specification (Release 11)".

As will be explained in more detail with reference to FIG. 2 to FIG. 15 in the following, the base station 11 may be configured to inform the UEs 2, 3, 4 located in the coverage area 9 of a change of the resources allocated for the D2D discovery and/or for the D2D communication. The base station 11 may determine that the resources allocated for the D2D discovery and/or for the D2D communication must be changed using any one of a variety of criteria, e.g. dependent on the number of UEs in the coverage area 9, the density of UEs in the coverage area 9, the uplink traffic over the air interface of the RAN, the total traffic over the air interface of the RAN, any combination of the above, or a wide variety of other criteria which will be exemplarily illustrated further below.

In the following, the resources allocated for the D2D discovery and/or for the D2D communication before a change takes place will be referred to as "first allocated resources". The resources allocated for the D2D discovery and/or for the D2D communication after the change takes place will be referred to as "second allocated resources". It is to be distinctly understood that the first allocated resources may, but do not need to be the resources for the D2D discovery and/or for the D2D communication originally allocated by the base station 11, but may be any set of resources allocated for the D2D discovery before the base station 11 implements a change in the allocated resources.

In order to inform the UEs 2, 3, 4 of a change of the resources allocated for the D2D discovery and/or for the D2D communication, the base station 11 may transmit information on the second allocated resources in at least one physical resource element of at least one physical resource block which is allocated for the D2D discovery and/or for the D2D communication before the change takes place. I.e., the base station 11 may transmit information on the second allocated resources in at least one physical resource element of at least one physical resource block of the first allocated resources which are used by the UEs 2, 3, 4 for the D2D discovery and/or for the D2D communication before the change in the allocated resources takes place. The base station 11 may transmit information on the second allocated resources in subcarrier frequencies and/or time slots which are used by the UEs 2, 3, 4 for the D2D discovery and/or for the D2D communication before the change in the allocated resources takes place. The base station 11 may transmit information on the second allocated resources in subcarrier frequencies and/or time slots which are uplink resources.

Alternatively or additionally to the transmission of information on the second allocated resources by the base station 11, a repeater relay or another user equipment may transmit the information on the second allocated resources.

The base station 11 may be configured to transmit the information on the second allocated resources as a broadcast or multicast radio signal 8 which is transmitted at a frequency and/or at a transmit time which is determined based on the first allocated resources.

Only UEs 2, 3, 4 which participate in the D2D discovery and/or the D2D communication monitor the at least one physical resource element of the physical resources allocated for the D2D discovery and/or for the D2D communication before the change takes place. Unnecessary processing of the information on the second allocated resources by non-ProSe-enabled UEs, such as the UE 5, can be avoided.

The information on the second allocated resources may determine a size of the second allocated resources. For illustration, the information on the second allocated resources may include one bit or a plurality of bits which indicates a size of the second allocated resources in the time domain and/or frequency domain. Thereby, the base station can easily adapt the size of the resources available for the D2D discovery and/or for the D2D communication. For illustration, if more resources are required for uplink communication between the UEs 2, 3, 4, 5 in the coverage area 9 and the base station 11, the base station 11 may decrease the size of the resources available for the D2D discovery and/or for the D2D communication. If fewer resources are required for uplink communication between the UEs 2, 3, 4, 5 in the coverage area 9 and the base station 11, the base station 11 may increase the size of the resources available for the D2D discovery and/or for the D2D communication.

The information on the second allocated resources may include any one or any combination of other parameters which define the second allocated resources. For illustration, the parameter defining the second allocated resources may include a size of the allocated second resources in the time domain and/or a size in the frequency domain, a periodicity in the time domain, a timer value which indicates for how long the second allocated resources apply, a counter values which indicates for how many periods of periodic uplink resources the second allocated resources apply, or similar. Additional parameters of the second allocated resources may be communicated using a system information block message or may be static. Examples for such additional parameters may include the position of the at least one resource element, i.e., the subcarrier frequency and/or transmit time of the at least one resource element in which the information on the second allocated resources is transmitted.

The base station 11 may also transmit additional information on the second allocated resources using RRC signaling and/or by transmitting a system information block (SIB) message. The base station 11 may transmit the additional information conditionally only when a slowly varying parameter of the D2D discovery resource allocation changes. One example for such a slowly varying parameter is an indicator for an allocation period which determines for how long the resources allocated for the D2D discovery must remain unchanged before a change can be implemented. The parameters of the resources allocated for the D2D discovery cannot change during the allocation period. The allocation period can also be referred to as "change cycle", because it indicates the cycle after which a change in the allocated resources for the D2D discovery can occur. The allocation period does not need to be changed frequently. Therefore, the base station 11 may communicate the allocation period also using a SIB message or by using RRC signaling. Similarly, the position of the at least one resource element in which information on the second allocated resources is transmitted may be changed using a SIB message, for example.

The UEs 2, 3, 4 may monitor the physical resource elements of the first physical resources to detect information on a change of the physical resources allocated for the D2D discovery. The UEs 2, 3, 4 may determine a size of the second allocated resources based on the physical resource elements of the first physical resources, for example. The UEs 2, 3, 4 may start using the second allocated resources at a pre-determined time. For illustration, the UEs 2, 3, 4 may monitor a timeout of a timer to determine whether a first allocation period for the first allocated resources has expired. The UEs 2, 3, 4 may automatically start using the second allocated resources for the D2D discovery upon expiry of the first allocation period.

The physical resource elements and/or the information transmitted in those physical resource elements may be implemented in a wide variety of ways, as will be explained in more detail with reference to FIG. 2 to FIG. 15.

Figure 2:
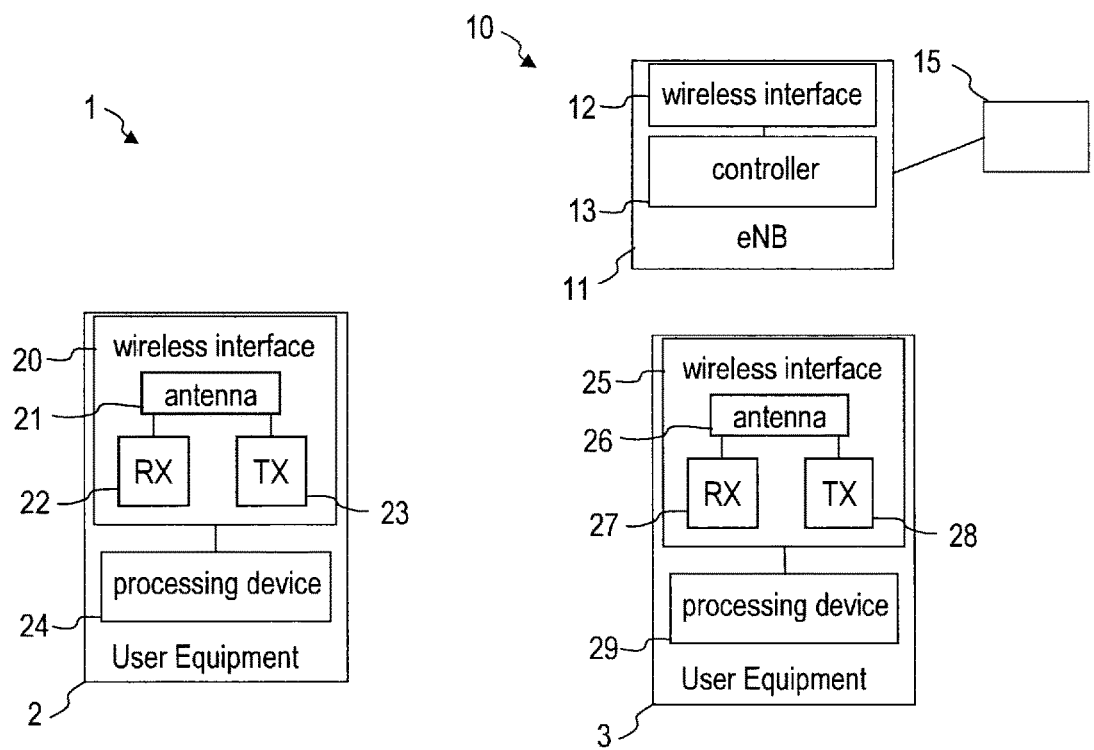
FIG. 2 shows the communication system of FIG. 1, which includes a plurality of Proximity Service-enabled user equipments.

FIG. 2 is a schematic block diagram of a communication system 1 according to an embodiment. The base station 11 of the RAN 10 is connected to a node 15 of the RAN or the core network (CN). For illustration, for a base station 11 implemented as an eNodeB, the node 15 may be implemented as an MME or S-GW.

The UE 2 has a wireless interface 21. The wireless interface 21 may be configured to communicate with the RAN 10. The wireless interface 21 may be configured for communication over the E-UTRA air interface.

The UE 2 has a processing device 24 connected to the wireless interface 21. The processing device 24 may comprise one or several microprocessors, one or several microcontroller, one or several processors, one or several control devices, one or several application specific integrated circuits (ASICs) and/or a combination of such devices. The processing device 24 may be configured to control the wireless interface 21 to detect a further UE 3 located in proximity to the UE 2. The processing device 24 may be configured to control the wireless interface 21 to perform a D2D discovery. The processing device 24 may be configured to control a transmitter path 24 of the wireless interface 21 to transmit a signal to the further UE 3 via an antenna 22 to indicate that the UE 2 is looking for a further UE for D2D communication and/or to indicate that the UE 2 would be capable of performing D2D communication. The processing device 24 may be coupled to a receiver path 23 of the wireless interface 21 to process a message received from the further UE 3. The message received from the further UE may indicate that the UE 3 would be suitable for D2D communication.

The processing device 24 is configured to monitor physical resources allocated for the D2D discovery and/or for the D2D communication to detect the further UE 3. The processing device 24 is configured to adapt the physical resources allocated for the D2D discovery and/or for the D2D communication from first physical resources to second physical resources in response to information on the second physical resources received from the base station 11. The UE 2 may be configured to monitor one or several fixed physical resource elements of a physical resource block of the first physical resources to detect whether the base station 11 transmits information on the second allocated resources in the fixed physical resource elements of the first physical resources.

The further UE 3 has a wireless interface 25 including an antenna 26, a received path 27, and a transmitter path 28, and a processing device 29. These entities may be configured in the same way as explained for the UE 2. In particular, the wireless interface 25 may be configured to communicate with the RAN 10. The wireless interface 25 may be configured for communication over the E-UTRA air interface. The wireless interface 25 may further be configured for D2D communication with the wireless interface 20 of the UE 2. The processing device 29 of the further UE 3 may also be configured to monitor physical resources allocated for the D2D discovery to detect the UE 2. The processing device 29 may be configured to adjust the physical resources allocated for the D2D discovery and/or for the D2D communication from first physical resources to second physical resources in response to information on the second physical resources received from the base station 11. The further UE 3 may be configured to monitor one or several fixed physical resource elements of a physical resource block of the first physical resources to detect whether the base station 11 transmits information on the second allocated resources in the fixed physical resource elements of the first physical resources.

The base station 11 includes a wireless interface 12. The wireless interface 12 may be configured to communicate with the UEs 2, 3. The wireless interface 12 may be configured for communication over the E-UTRA air interface.

A control device 13 of the base station 11 may control the wireless interface 12 to allocate resources for the D2D discovery. The control device 13 may comprise one or several microprocessors, one or several microcontroller, one or several processors, one or several control devices, one or several application specific integrated circuits (ASICs) and/or a combination of such devices.

The control device 13 may control the wireless interface 12 to inform the UE 2 and the further UE 3 of a change in the resources allocated for the D2D discovery and/or for the D2D communication. When first allocated resources are allocated for the D2D discovery and/or for the D2D communication prior to the change, the control device 13 may control the wireless interface 12 to transmit information on second allocated resources which will be used by the UE 2 and the further UE 3 in the future. The control device 13 may control the wireless interface 12 such that the information on the second allocated resources is transmitted at a frequency and/or at a transmit time which corresponds to the first allocated resources which are allocated for the D2D discovery and/or for the D2D communication prior to the change. The information on the second allocated resources may define a size, a periodicity, and/or an allocation period of the second allocated resources, for example, without being limited thereto.

Figure 3:
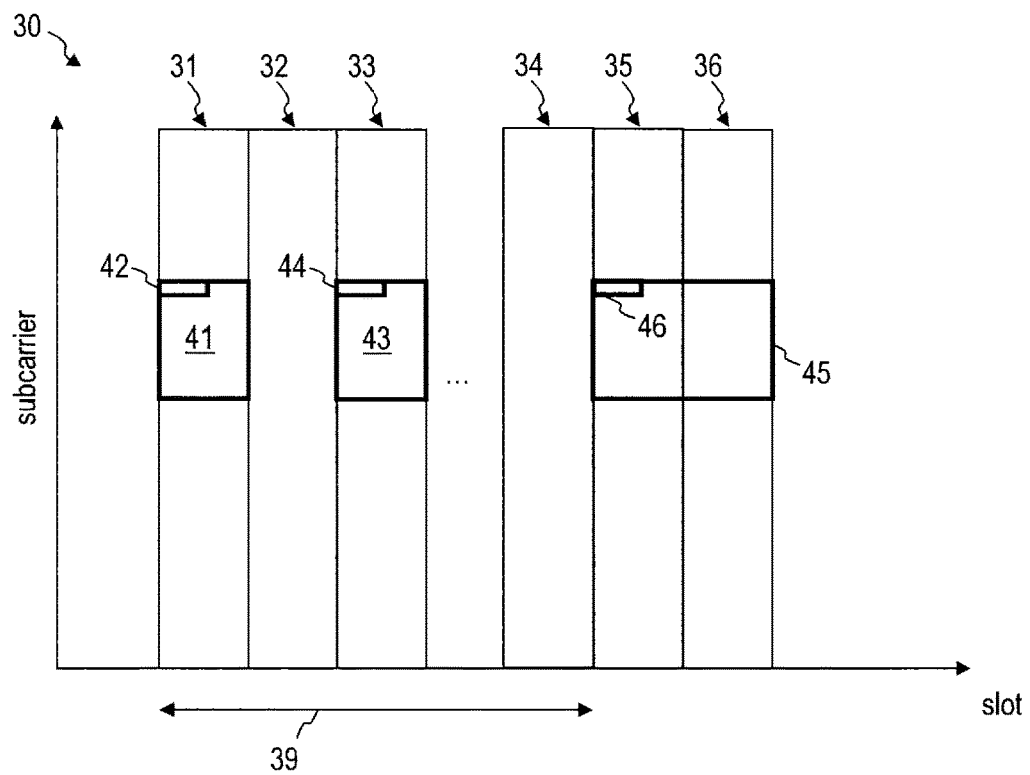
FIG. 3 is a diagram of allocated resources for device-to-device discovery to illustrate operation of a base station and a user equipment according to an embodiment.

FIG. 3 is a diagram which illustrates the implementation of a change of the resources allocated for the D2D discovery and/or for the D2D communication. The resources 30 include a plurality of resources 31, 32, 33, 34, 35, 36 which may be frequency multiplexed. In each time slot, signals may be transmitted at several subcarrier frequencies. The resources 31, 32, 33, 34, 35, 36 may be uplink resources.

First allocated resources 41, 43 are allocated for the D2D discovery and/or for the D2D communication before the allocated resources are changed. The first allocated resources 41, 43 may include a plurality of physical resource block (PRBs). Each PRB may include a plurality of physical resources elements. The first allocated resources 41, 43 may be periodic resources which periodically repeat in time slots 31, 32, 33 until a first allocation period 39 expires. The UEs which are capable of performing D2D communication may transmit signals in the first allocated resources 41, 43 for the D2D discovery and/or for the D2D communication. Alternatively or additionally, the UEs which are capable of performing D2D communication may monitor signals in the first allocated resources 41, 43 for the D2D discovery.

In at least one physical resource element 42, 44 of a PRB of the first allocated resources 41, 43, the base station 11 transmits information on second allocated resources which are to be used for the D2D discovery and/or for the D2D communication after expiry of the first allocation period. In the illustrated implementation, the base station may transmit information indicating that a size of the resources for the D2D discovery and/or for the D2D communication is to be increased in the time domain, e.g. by doubling the length in the time domain.

The UEs monitor the at least one physical resource element 42, 44. The UEs may detect a change in the allocated resources for the D2D discovery and/or for the D2D communication based on the information included in the at least one physical resource element 42, 44. This allows the UEs to retrieve at least one parameter of the second allocated resources, e.g. a size of the second allocated resources.

The resources allocated for the D2D discovery and/or for the D2D communication are changed from the first allocated resources 41, 43 to the second allocated resources 45. For illustration, the second allocated resources 45 may have a size in the time domain which is different from the size of the first allocated resources 41, 43 in the time domain. The information included in the at least one physical resource element 42, 44 may define which size out of a plurality of pre-defined sizes the second allocated resources 45 have. For illustration, the UEs and the base station may support a set of pre-defined sizes of the discovery windows that may be used for the D2D discovery and/or for the D2D communication. The information included in the at least one physical resource element 42, 44 may be an indicator for one of the pre-defined sizes.

The base station may transmit information on a further change in the resources allocated for the D2D discovery and/or for the D2D communication in at least one physical element 46 of the second allocated resources. Thereby, yet another adaption of the resources allocated for the D2D discovery and/or for the D2D communication may be communicated to the UEs.

The at least one physical resource element 42, 44 has a fixed location in the first physical resources 42, 44. The at least one physical resource element 42, 44 may have a fixed frequency within the PRB in which it is included (e.g. the subcarrier with the lowest frequency or the subcarrier with the highest frequency within the PRB) and/or a fixed transmission time within the PRB in which it is included (e.g. the first slot(s) and/or the first OFDM symbol(s) of the PRB). The frequency and time of the at least one physical resource element 42, 44 in the PRB may also be referred to as "location" of the physical resource element 42, 44 within the respective PRB(s).

The frequency and/or transmission time of the at least one physical resource element 46 in the second allocated resources 45 may be the same as the frequency and/or transmission time of the at least one physical resource element 42, 44 in the first allocated resources 41, 43. The at least one physical resource element 46 may have a fixed frequency within the PRB of the second allocated resources 45 in which it is included (e.g. the subcarrier with the lowest frequency or the subcarrier with the highest frequency within the PRB) and/or a fixed transmission time within the PRB of the second allocated resources 45 in which it is included (e.g. the first slot(s) and/or the first OFDM symbol(s) of the PRB). The position of the at least one physical resource element 42, 44 in a PRB of the first allocated resources 41, 43, measured e.g. relative to a first symbol and first subcarrier frequency of the first allocated resources 41, 43, may be the same as the position of the at least one physical resource element 46 in a PRB of the second allocated resources 45, measured e.g. relative to a first symbol and first subcarrier frequency of the second allocated resources 45.

The UEs may use the second allocated resources 45 for the D2D discovery and/or for the D2D communication until a second allocation period expires. The second allocation period may be the same as the first allocation period 39. The UEs may continue to apply the same allocation period, i.e., may keep the parameters of the resources allocated for the D2D discovery and/or for the D2D communication unchanged for the same allocation period, until the base station transmits information on a new allocation period.

As explained with reference to FIG. 3, the size of the resources allocated for the D2D discovery and/or for the D2D communication may be adapted in the time domain. For illustration, discovery windows of 5 slots, 10 slots, 15 slots, or 20 slots may be allocated by the base station as resources for the D2D discovery and/or for the D2D communication. In addition or alternatively to changing a size of the resources allocated for the D2D discovery and/or for the D2D communication in the time domain, the size of the resources allocated for the D2D discovery and/or for the D2D communication may also be changed in the frequency domain.

Figure 4:
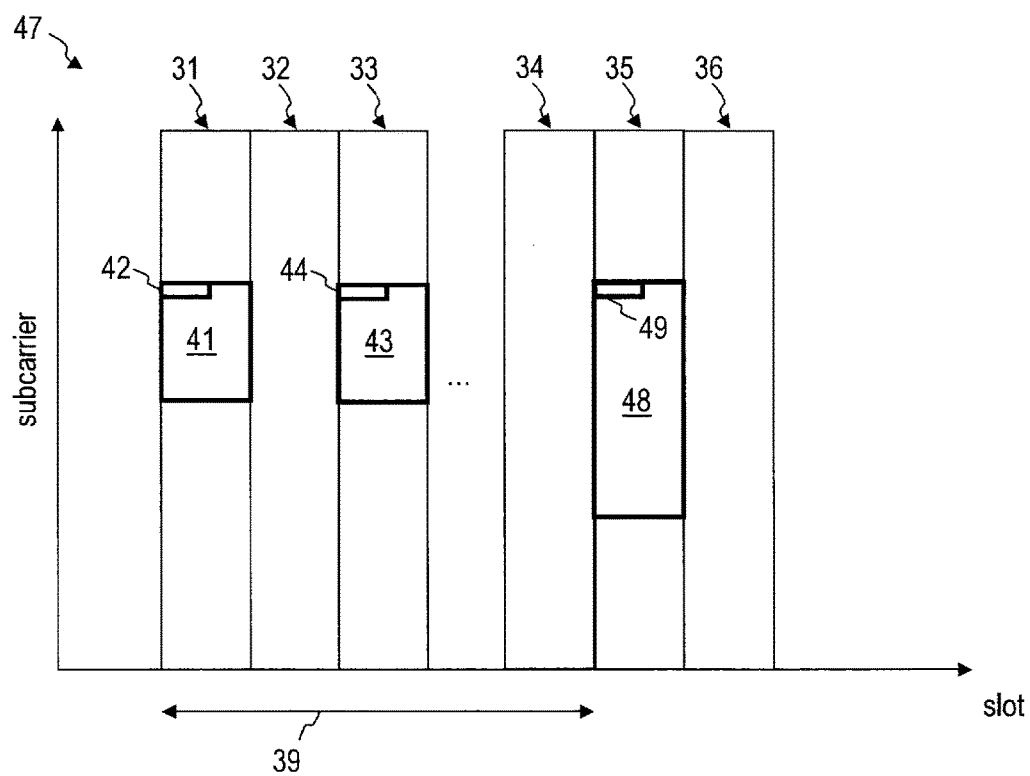
FIG. 4 is a diagram of allocated resources for device-to-device discovery to illustrate operation of a base station and a user equipment according to another embodiment.

FIG. 4 is a diagram which illustrates the implementation of a change of the resources allocated for the D2D discovery and/or for the D2D communication according to another embodiment. In FIG. 4, the second allocated resources 48 are different in size from the first allocated resources 41, 43 in the frequency domain. For illustration, the second allocated resources 48 may include a greater or smaller number of subcarrier frequencies in each slot than the first allocated resources 41, 43. The base station may transmit information on the size of the second allocated resources 48 in at least one physical resource element 42, 44 of the first allocated resources 41, 43. The base station may transmit information on a further change of the resources allocated for the D2D discovery and/or for the D2D communication in at least one physical resource element 49 of the second allocated resources 48. The at least one physical resource element 49 which includes information on possible further adaptations of the allocated resources may have the same fixed location relative to a PRB of the second allocated resources 48 as the at least one resource element 42, 44 relative to the first allocated resources 41, 43.

A change in the time allocated for the D2D discovery and/or for the D2D communication, as explained with reference to FIG. 3, and a change in the frequencies allocated for the D2D discovery and/or for the D2D communication, as explained with reference to FIG. 4, may also be combined with each other.

Figure 5:
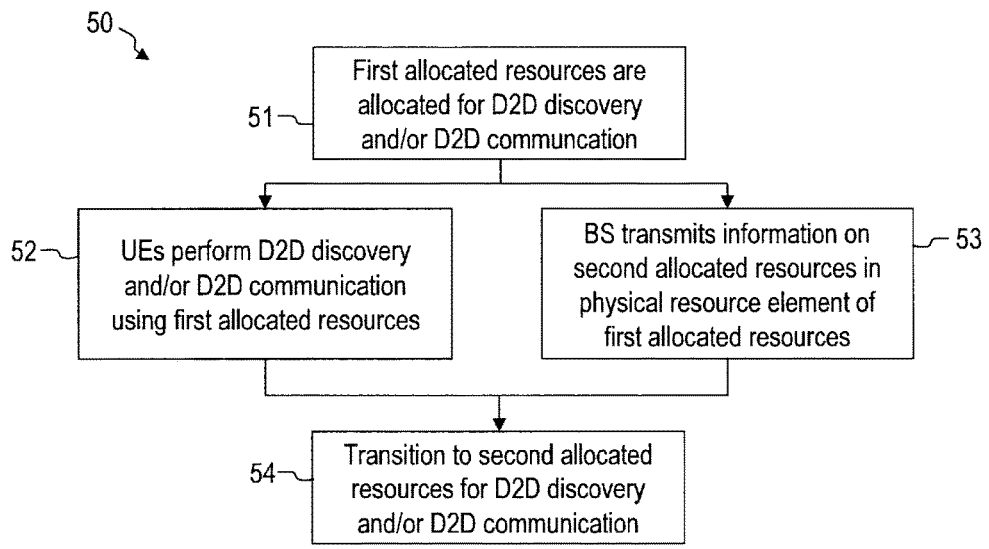
FIG. 5 is a flow chart of a method according to an embodiment.

FIG. 5 is a flow chart of a method 50 according to an embodiment. The method 50 may be performed by the communication system of FIG. 1 and FIG. 2.

At 51, first allocated resources are allocated for the D2D discovery and/or for the D2D communication. The allocation of the first allocated resources may be performed by the transmission of a SIB message by the base station or by RRC signaling, for example.

At 52, while the first allocated resources are allocated for the D2D discovery and/or for the D2D communication, the UEs located in the coverage area of the base station perform D2D discovery using the first allocated resources. A UE may transmit information at frequencies and/or at transmission times selected according to the first allocated resources, to indicate that the UE is available for D2D communication and/or to request a partner for D2D communication. Alternatively or additionally, a UE may receive information at frequencies and/or at reception times selected according to the first allocated resources, which indicate that a further UE is available for D2D communication and/or that the further UE requests a partner for D2D communication.

At 53, while the first allocated resources are allocated for the D2D discovery and/or for the D2D communication, the base station (BS) may transmit information on second allocated resources in one physical resource element or several physical resource elements of the first allocated resources. The information on second allocated resources may be transmitted at frequencies and/or at transmission times selected according to the first allocated resources. The at least one physical resource element may have the same, fixed location in several PRBs of the first allocated resources.

The UEs which are configured for D2D discovery and D2D communication may monitor the at least one physical resource element or several physical resource elements of the first allocated resources in which the base station transmits the information on the second allocated resources. The UEs may evaluate the information included in the at least one physical resource element or several physical resource elements of the first allocated resources to detect that the allocated resources for the D2D discovery and/or for the D2D communication will be changed.

At 54, the UEs start using the second allocated resources for the D2D discovery and/or for the D2D communication. The transition from the first allocated resources to the second allocated resources may be triggered at a certain time, e.g. when a first allocation period for the first allocated resources expires. The transition may also be triggered by other events, e.g. by transmission of a dedicated signal.

After the transition, while the second allocated resources are allocated for the D2D discovery and/or for the D2D communication, the UEs located in the coverage area of the base station perform D2D discovery and/or for the D2D communication using the second allocated resources. A UE may transmit information at frequencies and/or at transmission times selected according to the second allocated resources, to indicate that the UE is available for D2D communication and/or to request a partner for D2D communication. Alternative or additionally, a UE may receive information at frequencies and/or at reception times selected according to the second allocated resources, which indicate that a further UE is available for D2D communication and/or that the further UE requests a partner for D2D communication.

Figure 6:
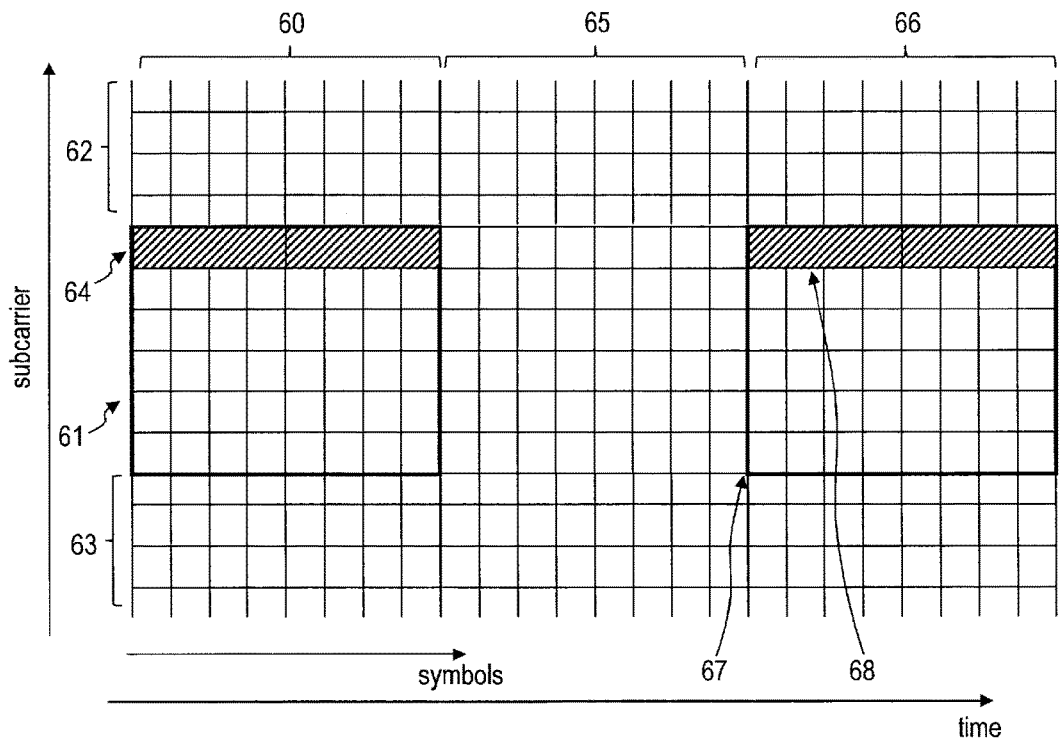
FIG. 6 is a diagram of resource blocks of allocated resources for device-to-device discovery to illustrate operation of a base station and a user equipment according to an embodiment.

FIG. 6 is a diagram which illustrates the allocation of resources for D2D discovery and/or for D2D communication. Several slots 60, 65, 66 may be resources for uplink communication. Each slot 60, 65, 66 may include a plurality of symbols. The symbols may be OFDM symbols. Other modulation schemes may be used. Frequency multiplexing may be performed. Several different subcarrier frequencies may be used for the simultaneous transmission of symbols, for example.

Physical resource blocks 61, 67 may be allocated for the D2D discovery and/or for the D2D communication. The physical resource blocks 61, 67 allocated for the D2D discovery and/or for the D2D communication may be periodic uplink resources. The physical resource blocks 61, 67 may include at least one subcarrier frequency. The physical resource blocks 61, 67 may include several subcarrier frequencies. Each physical resource block 61, 67 may include the symbols of one slot or of several slots for the respective subcarrier frequencies.

Other subcarrier frequencies 62, 63 outside of the allocated physical resource blocks 61 in the slots 60, 66 can still be used for conventional uplink communication between a UE and the base station. The physical resource blocks 61, 67 allocated for the D2D discovery may be periodic physical resource blocks 61, 67. For illustration, a physical resource block allocated for the D2D discovery and/or for the D2D communication may start at every $N^{th}$ slot, where N is an integer greater than one. At least one slot 65 may be interposed between a slot 60 having the physical resource block 61 for the D2D discovery and/or for the D2D communication and a slot 66 having the subsequent physical resource block 62 for the D2D discovery and/or for the D2D communication. The periodicity of the allocated resources is another example for a parameter which may be adapted by the base station.

One or several physical resource elements 64 in the physical resource block 61 may be used by the base station to inform the UEs that the allocated resources are changed. One or several physical resource elements 68 in the subsequent physical resource block 66 may be used to inform the UEs that the allocated resources are changed. The physical resource elements 64, 68 may have a fixed location. The physical resource elements 64, 68 may be the first physical resource elements of each one of a block of physical resource blocks 61, 67, for example.

It will be appreciated that the physical resource elements 64, 68 may have a wide variety of different implementations. For illustration, the physical resource elements 64, 68 may be provided in only some of the physical resource blocks allocated for the D2D discovery and/or for the D2D communication. The physical resource elements 64, 68 may be included only in the first pair of physical resource blocks of the first allocated resources, for example. The physical resource elements 64, 68 may be periodically included in every $k^{th}$ physical resource block, where k is an integer greater than one. The physical resource elements 64, 68 in each physical resource block may include one subcarrier frequency in one slot or several slots. The physical resource elements 64, 68 in each physical resource block may include several subcarrier frequencies in one slot or several slots. The physical resource elements 64, 68 included in different physical resource blocks 61, 67 may respectively include the same number of physical resource elements. The physical resource elements 64, 68 included in different physical resource blocks 61, 67 may respectively be located at the same subcarrier frequency.

The information transmitted by the base station in the physical resource elements 64, 68 may define at least one parameter of the second allocated resources which are to be used by the UEs for the D2D discovery and/or for the D2D communication after the change takes place. Examples of the parameters include a size in the time domain, a size in the frequency domain, a periodicity, and/or an allocation period of the physical resource blocks in the second allocated resources.

Figure 7:
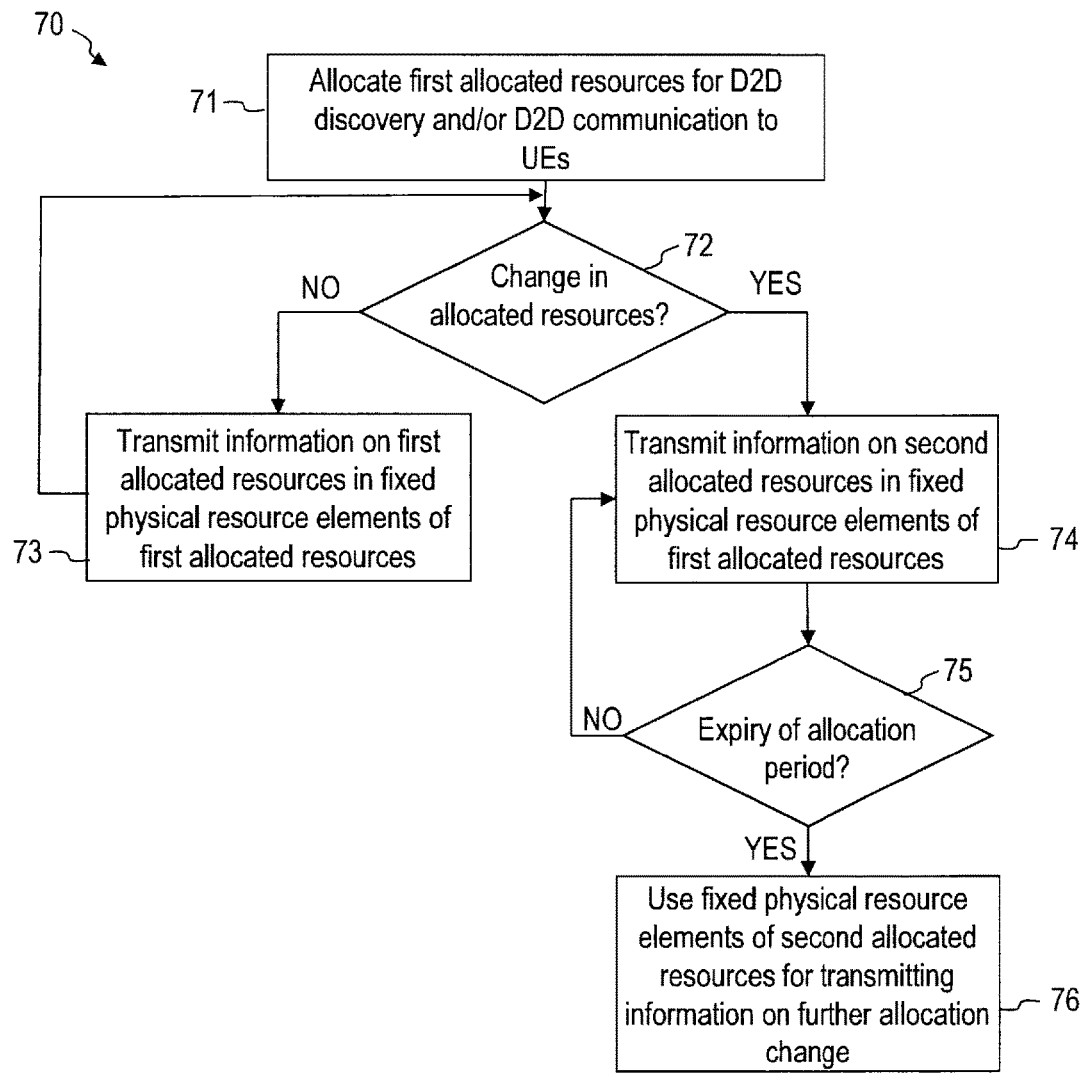
FIG. 7 is a flow chart of a method according to an embodiment.

FIG. 7 is a flow chart of a method 70 according to an embodiment. The method 70 may be performed by a base station according to an embodiment.

At 71, the base station may allocate first allocated resources as the resources for the D2D discovery and/or for the D2D communication to the UEs located in the coverage area of the base station. The base station may transmit a SIB message or may perform RRC signaling to allocate the first allocated resources as the resources for the D2D discovery and/or for the D2D communication to the UEs. Alternatively, the base station may inform the UEs of at least one parameter of the first allocated resources by including this information in at least one physical resource element of resources that have previously been allocated for the D2D discovery and/or for the D2D communication.

At 72, the base station determines whether the resource allocation needs to be adapted. The base station may determine whether any change shall be made to the resources for the D2D discovery and/or for the D2D communication. The determining at step 72 may be performed on any one or any combination of a wide variety of input parameters, e.g.

desired bandwidth for uplink communication, desired bandwidth for D2D discovery and/or for the D2D communication, number of UEs within the coverage area, density of UEs, emergency call situations, or still other input parameters.

At 73, if it has been determined that no change needs to be made to the resources allocated for the D2D discovery and/or for the D2D communication, the UEs may continue to use the first allocated resources for the D2D discovery and/or for the D2D communication. The UEs may continue to use the first allocated resources for the D2D discovery and/or for the D2D communication for at least one further first allocation period. The base station may optionally transmit information on the first allocated resources, e.g. a size of the first allocated resources, in at least one physical resource element of the first allocated resources. This informs the UEs that no change is to be made to the resources allocated for the D2D discovery and/or for the D2D communication. Additionally, UEs which attach to the base station and/or UE which enter the coverage area of the base station are informed of at least one parameter of the first allocated resources that is to be used for the D2D discovery and/or for the D2D communication. The method may return to step 72.

At 74, if it has been determined that no change needs to be made to the resources allocated for the D2D discovery and/or for the D2D communication, the base station may transmit information on second allocated resources, e.g. a size of the second allocated resources, in at least one physical resource element of the first allocated resources. The UEs may continue to use the first allocated resources for the D2D discovery and/or for the D2D communication at this step. This informs the UEs that a change is to be made to the resources allocated for the D2D discovery.

At 75, the base station may monitor when a first allocation period for the first allocated resources terminates. The base station may monitor whether the first allocated resources have been allocated for the D2D discovery and/or for the D2D communication for a time and/or a number of slots which defines the first allocation period. If the first allocation period has not yet expired, the base station may continue to transmit information on the second allocation resources in at least one resource element of the first physical resources at step 74. Otherwise, the method may proceed to step 76.

At 76, when the first allocation period has expired and the UEs start using the second allocated resources for the D2D discovery and/or for the D2D communication, the base station may transmit information on a further change of the allocated resources in at least one physical resource element of the second allocated resources. The method may perform the same steps as previously explained with reference to steps 71 to 75 to inform the UEs of yet another change of the allocated resources, when needed.

Figure 8:
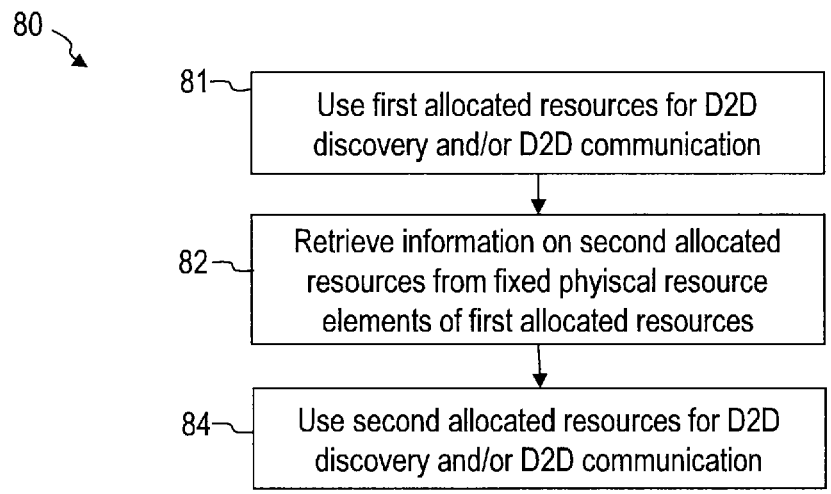
FIG. 8 is a flow chart of a method according to an embodiment.

FIG. 8 is a flow chart of a method 80 according to an embodiment. The method 80 may be performed by a UE according to an embodiment.

At 81, the UE uses first allocated resources for the D2D discovery. The UE may transmit a message to at least one further UE located in proximity to the UE, to indicate that the UE would be available for D2D communication and/or to request information on whether the at least one further UE is capable of performing D2D communication. The transmission time and/or subcarrier frequency at which the message is transmitted may be set in accordance with the first allocated resources. The UE may receive a message from the at least one further UE located in proximity to the UE, which indicates that the at least one further UE would be available for D2D communication. The reception time and/or subcarrier frequency at which the UE monitors a transmission received from the at least one further UE may be set in accordance with the first allocated resources.

At 82, while the UE still uses the first allocated resources for the D2D discovery and/or for the D2D communication, the UE may retrieve information on second allocated resources from at least one physical resource element of the first allocated resources. The retrieved information may be indicative of a parameter of the second allocated resources. The UE may monitor at least one subcarrier frequency of one or several physical resource blocks of the first allocated resources to retrieve the information on the second allocated resources which has been transmitted by the base station.

At 84, the UE may use the second allocated resources for the D2D discovery and/or for the D2D communication. The UE may transmit a message to at least one further UE located in proximity to the UE, to indicate that the UE would be available for D2D communication and/or to request information on whether the at least one further UE is capable of performing D2D communication. The transmission time and/or subcarrier frequency at which the message is transmitted may be set in accordance with the second allocated resources. The UE may receive a message from the at least one further UE located in proximity to the UE. The reception time and/or subcarrier frequency at which the UE monitors for transmissions from the at least one further UE may be set in accordance with the second allocated resources.

The transition from the first allocated resources for the D2D discovery and/or for the D2D communication to the second allocated resources for the D2D discovery and/or for the D2D communication may be triggered in various ways. For illustration, an expiry of an allocation period may trigger the transition.

Figure 9:
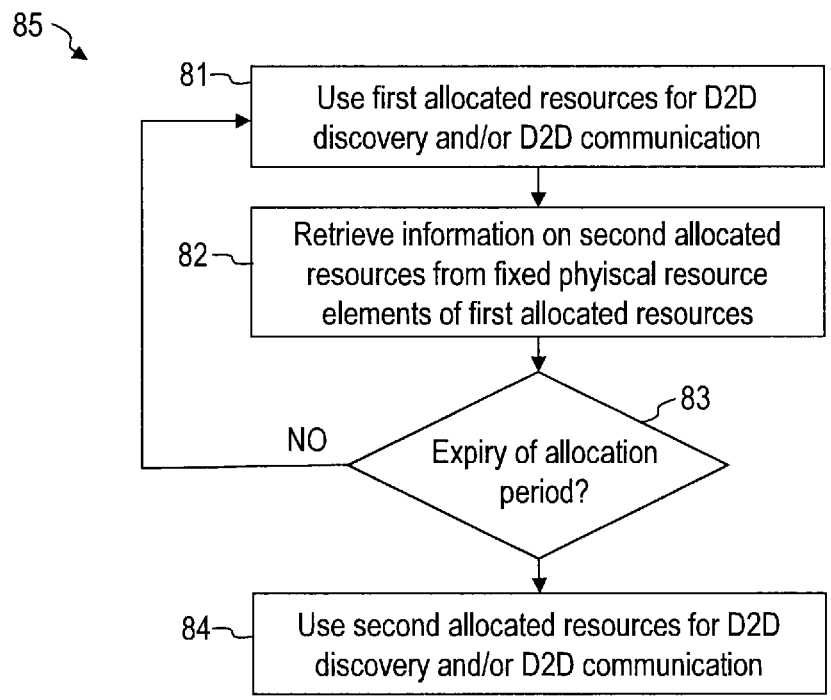
FIG. 9 is a flow chart of a method according to an embodiment.

FIG. 9 is a flow chart of a method 85 according to an embodiment. The method 85 may be performed by a UE according to an embodiment. The method 85 is similar to the method 80 explained with reference to FIG. 8.

After retrieval of the information on the second allocated resources at step 82, the UE may monitor at 83 whether a first allocation period for the first allocated resources has expired. If the first allocation period has not yet expired, the method may return to step 81. The UE may continue to receive information on the second allocated resources in further physical resource blocks. When it is determined that the first allocation period has expired, this triggers the transition to the second allocated resources. The UE may start using the second allocated resources for the D2D discovery and/or for the D2D communication at step 84.

Figure 10:
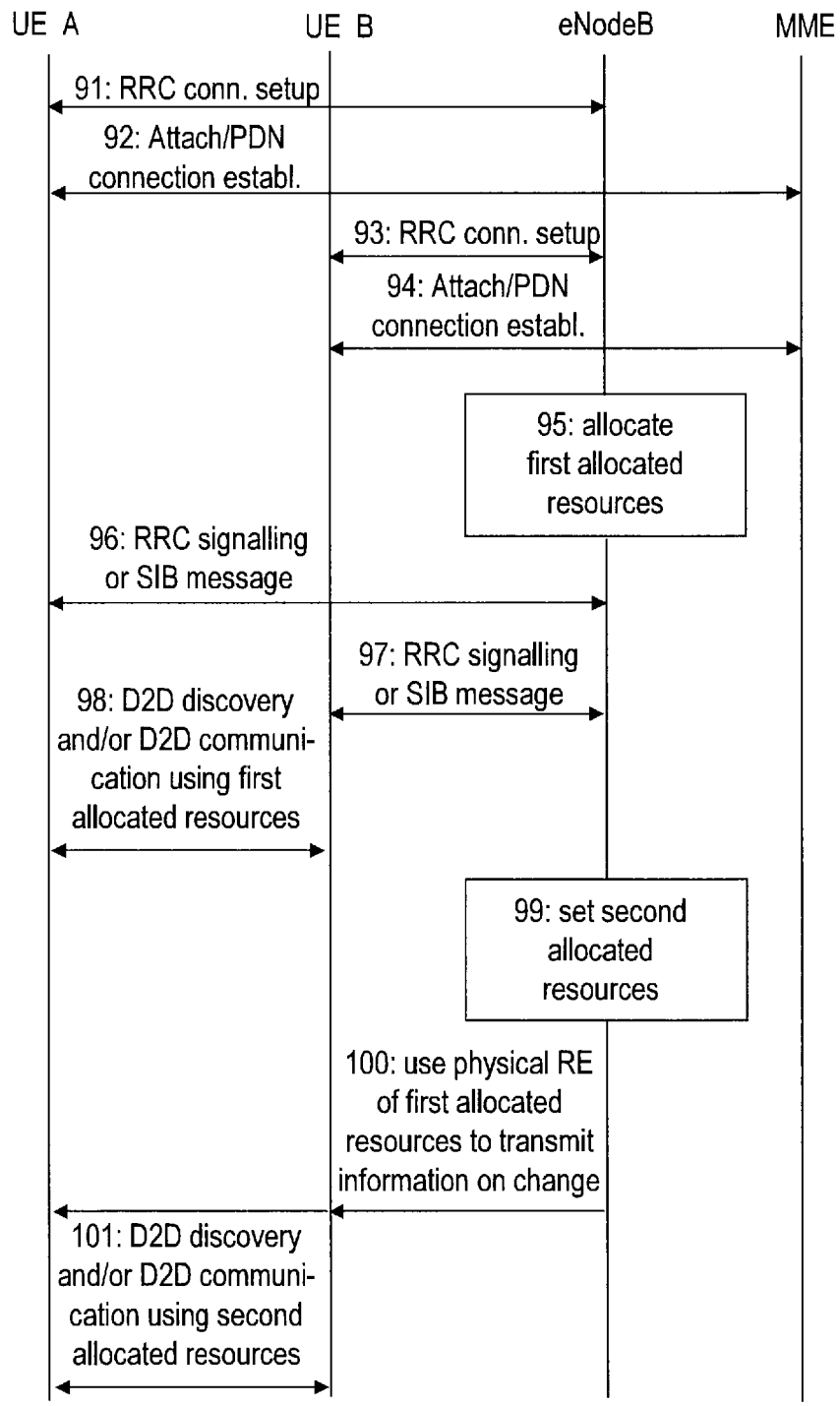
FIG. 10 is a diagram which illustrates signaling between a base station according to an embodiment and at least one user equipment according to an embodiment.

FIG. 10 is a diagram which illustrates signaling between a base station according to an embodiment and at least one user equipment according to an embodiment. In the diagram of FIG. 10, two UEs are illustrated which will be referred to as first UE A and second UE B. It will be appreciated that the signaling is not limited to any particular number of UEs within the coverage range of the base station. The base station may be an eNodeB.

An RRC connection setup 91 may be performed between the first UE A and the base station of the cell in which the first UE A is located. The first UE A may perform an attach/packet data network (PDN) connection establishment 92. An RRC connection setup 93 may be performed between the second UE B and the base station of the cell in which the second UE B is located. The second UE B may perform an attach/packet data network (PDN) connection establishment 94.

At 95 the base station may set first allocated resources which are allocated to both the first UE A and the second UE B for the D2D discovery and/or for the D2D communication. The base station may set the first allocated resources depending on any one or any combination of parameters, including the uplink traffic, the number of UEs, and/or the density of UEs. The base station may select a size of the first allocated resources in the time domain and/or a size in the frequency domain as a function of the uplink traffic, the number of UEs, the density of UEs or other parameters.

The base station may perform RRC signaling 96 or may transmit a SIB message 96 to the first UE A to inform the first UE A of the allocated first resources, for example. The base station may perform RRC signaling 97 or may transmit a SIB message 97 to the second UE B to inform the first UE B of the allocated first resources, for example. While shown as separate transmissions in FIG. 10, information on the first allocated resources may be simultaneously broadcast to the UEs within the coverage area of the base station.

At 98, the first UE A and the second UE B may perform a D2D discovery using the first allocated resources. If the first UE A and the second UE B are located in proximity to each other, the first UE A and the second UE B may perform D2D communication. The D2D communication may be public safety related communication.

At 99, the base station determines that the resources for the D2D discovery and/or for the D2D communication shall be changed from the first allocated resources to the second allocated resources. At least one parameter of the second allocated resources, e.g. a size or periodicity, may be different from the first allocated resources.

At 100, the base station transmits information on the second allocated resources to both the first UE A and the second UE B. The information is transmitted in at least a portion of the first physical resources. The first UE A and the second UE B each monitor the respective physical resource elements in which the base station transmits the information on the second allocated resources. The first UE A and the second UE B determine at least one parameter of the second allocated resources by monitoring the at least one physical resource element in which the base station transmits the information on the second allocated resources.

At 101, the first UE A and the second UE B may perform a D2D discovery using the second allocated resources. If the first UE A and the second UE B are located in proximity to each other, the first UE A and the second UE B may perform D2D communication.

The resources allocated for the D2D discovery and/or for the D2D communication may be allocated in a semi-static manner. The resources allocated for the D2D discovery and/or for the D2D communication may remain unchanged for an allocation period. The allocation period may undergo changes. Changes in the allocation period may be less frequent than changes in the size of the allocated resources for the D2D discovery and/or for the D2D communication, for example. The allocation period may also be referred to as change cycle. The UEs and the base station may automatically start using new allocated resources when an allocation period for the old allocated resources for the D2D discovery and/or for the D2D communication expires.

Figure 11:
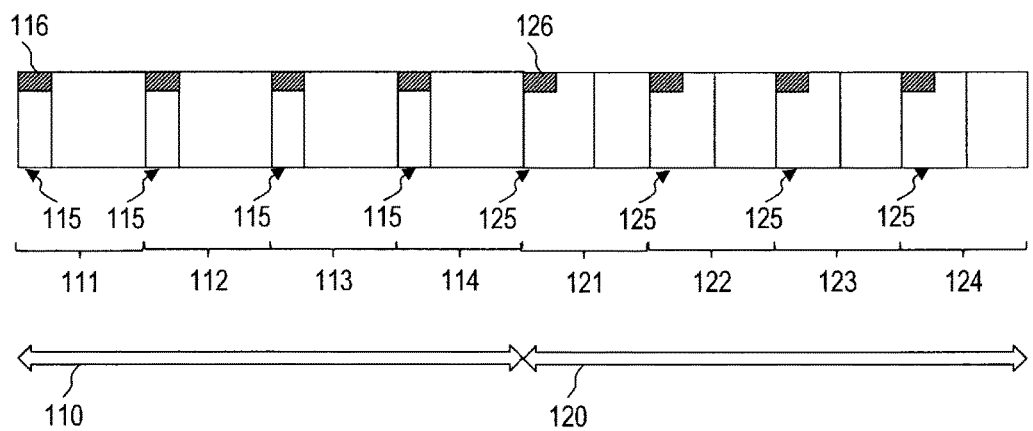
FIG. 11 is a diagram of allocated resources for device-to-device discovery to illustrate operation of a base station according to an embodiment and a user equipment according to an embodiment.

FIG. 11 illustrates an adaption of the resource allocation for the D2D discovery according to an embodiment. In an allocation period 110, first allocated resources 115 are allocated for the D2D discovery and/or for the D2D communication. In a subsequent allocation period 120, second allocated resources 125 are allocated for the D2D discovery. One slot or several slots 115 may be allocated for the D2D discovery and/or for the D2D communication. These resources may also be referred to as discovery window. In between the physical resource blocks allocated for the D2D discovery and/or for the D2D communication in the one or several slots 115, there may be one or several other slots which are available for uplink communication with the RAN. The combination of a discovery window of the first allocated resources 115 and one or several other slots which are not allocated for the D2D discovery and/or for the D2D communication may be repeated several times in the allocation period 110, as indicated by the groups of slots 111 to 114.

The base station may transmit information on a change in the resources allocated for the D2D discovery and/or for the D2D communication in at least one physical resource element 116 in several of the discovery windows or in each one of the discovery windows of the first allocated resources 115. For illustration, several or all of the discovery windows of the first allocated resources 115 may include at least one bit or several bits transmitted in the at least one physical resource element 116. This indicates a change in size of the resources allocated for the D2D discovery and/or for the D2D communication. The at least one physical resource element 116 may indicate a size of the second allocated resources which is an integer multiple of the first allocated resources in the time domain and/or the frequency domain, for example.

During the allocation period 110, the parameters of the resources allocated for the D2D discovery and/or for the D2D communication may remain unchanged even though the UEs have already received the information on the second allocated resources from the base station.

Upon expiry of the allocation period 110, the UEs start using the second allocated resources 125 for the D2D discovery and/or for the D2D communication. The second allocated resources 125 may include several slots, for example. The second allocated resources 125 may respectively have a size in the time domain which is an integer multiple of the first allocated resources 115. For illustration, the second allocated resources 125 may define a discovery window which includes two times as many slots as the discovery window of the first allocation resources 115. Two discovery windows of the second allocated resources 125 may be separated by several slots which are not allocated for the D2D discovery and/or for the D2D communication. The combination of a discovery window of the second allocated resources 125 and one or several other slots which are not allocated for the D2D discovery and/or for the D2D communication may be repeated several times in the allocation period 120, as indicated by the groups of slots 121 to 124.

The base station may transmit information on a change in the resources allocated for the D2D discovery and/or for the D2D communication in at least one physical resource element 126 in several of the discovery windows or in each one of the discovery windows of the second allocated resources 125. The at least one physical resource element 126 still is transmitted in a time period which corresponds to that of the at least one physical resource element 116. The at least one physical resource element 126 may be transmitted in a first frequency and in the first time slot(s) of each discovery window of the second allocated resources 125, and the at least one physical resource element 116 may be transmitted in a first frequency and in the first time slot(s) of each discovery window of the first allocated resources 115.

When periodic resources are allocated for the D2D discovery and/or for the D2D communication, as illustrated in FIG. 11, for example, the information on the second allocated resources may be encoded in various ways. For illustration, the information may be included several times in different physical resource blocks, as will be explained in more detail with reference to FIG. 12. For further illustration, the information may be split across several physical resource blocks which may be separated by a time gap, as will be explained in more detail with reference to FIG. 13.

Figure 12:
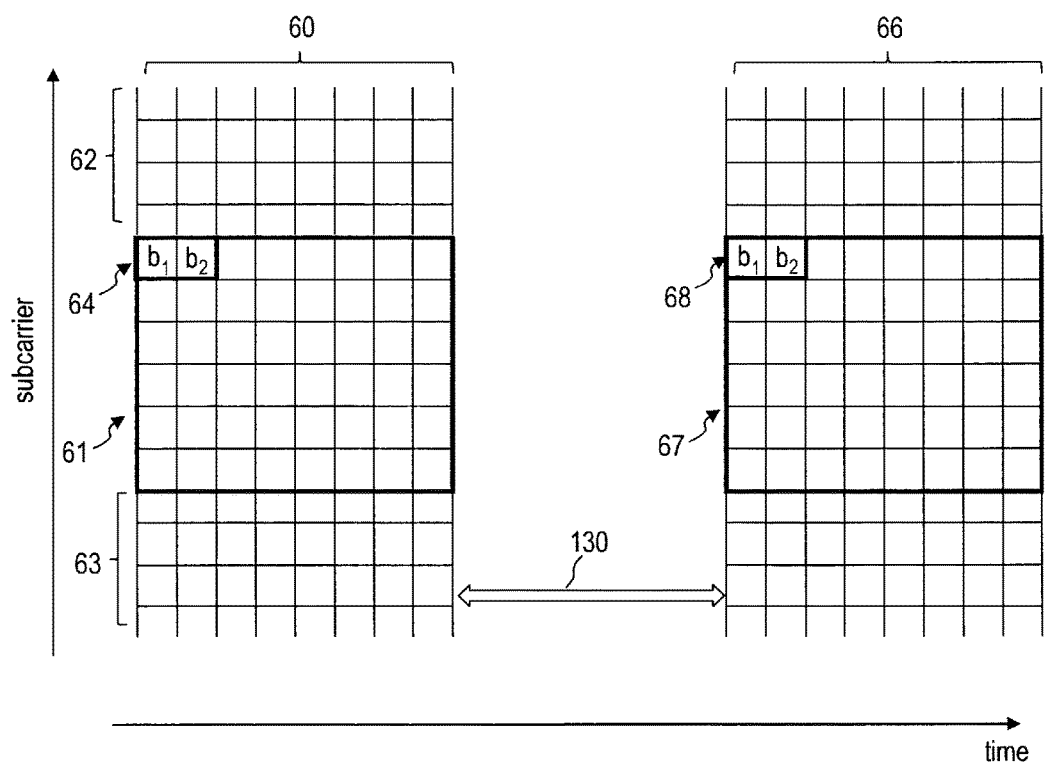
FIG. 12 is a diagram of resource blocks of allocated resources for device-to-device discovery to illustrate operation of a base station according to an embodiment and a user equipment according to an embodiment.

FIG. 12 illustrates first allocated resources 61, 67 which may be allocated for the D2D discovery and/or for the D2D communication, as explained with reference to FIG. 1 to FIG. 11 above. The information on second allocated resources transmitted by the base station may include at least one first bit $b_1$ and at least one second bit $b_2$. The at least one first bit $b_1$ and the at least one second bit $b_2$ in combination may define at least one parameter of the second allocated resources. The at least one physical resource element 64 in a physical resource block 61 of the first allocated resources may include both the at least one first bit $b_1$ and the at least one second bit $b_2$. The at least one physical resource element 68 in another physical resource block 67 of the first allocated resources may also include both the at least one first bit $b_1$ and the at least one second bit $b_2$. The other physical resource block 67 is transmitted at an interval 130 after the physical resource block 61. The same information may be transmitted several times by the base station in the at least one physical resource element of the first allocated resources. The redundancy may be used by the UEs for error detection and/or correction, for example. The redundancy also allows UEs to be informed of the second allocated resources when they attach to the base station after the first physical resource block 61, for example.

Figure 13:
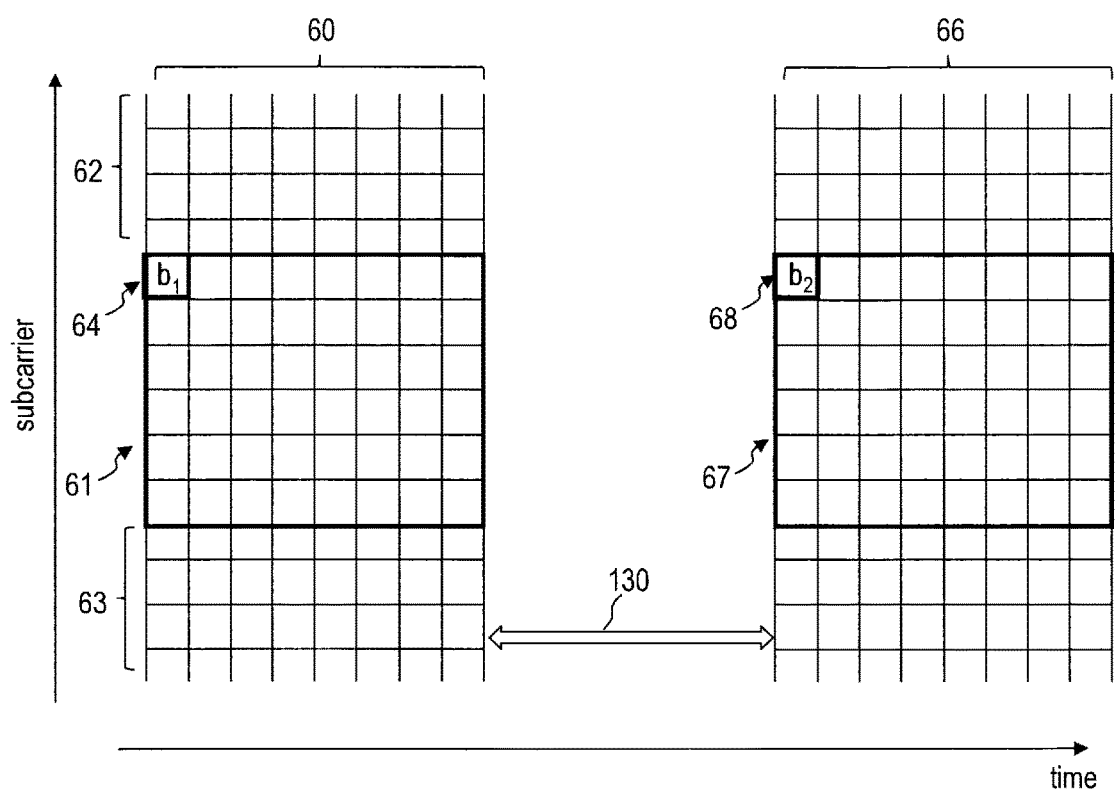
FIG. 13 is a diagram of resource blocks of allocated resources for device-to-device discovery to illustrate operation of a base station according to an embodiment and a user equipment according to an embodiment.

FIG. 13 illustrates first allocated resources 61, 67 which may be allocated for the D2D discovery and/or for the D2D communication, as explained with reference to FIG. 1 to FIG. 11 above. The information on second allocated resources transmitted by the base station may include at least one first bit $b_1$ and at least one second bit $b_2$. The at least one first bit $b_1$ and the at least one second bit $b_2$ in combination may define at least one parameter of the second allocated resources. The at least one physical resource element 64 in a physical resource block 61 of the first allocated resources may include the at least one first bit $b_1$, but not the at least one second bit $b_2$. The at least one physical resource element 68 in another physical resource block 67 of the first allocated resources may include the at least one second bit $b_2$, but not the at least one first bit $b_1$. The other physical resource block 67 is transmitted at an interval 130 after the physical resource block 61. By distributing the information on the second allocated resources which is encoded in the combination of the at least one first bit $b_1$ and the at least one second bit $b_2$ over several time slots, for example, more resources remain available for the D2D discovery and/or for the D2D communication. Interference problems may be mitigated.

Additional information on persistent or slowly changing parameters of the second allocated resources for the device-to-device discovery and/or the device-to-device communication may be sent in a system information block of a system information message, as will be explained in more detail with reference to FIG. 14 and FIG. 15. Alternatively, the information on persistent parameters may be fixed and may be defined by a specification, for example. Examples for such additional information on the second allocated resources include the position of the at least one physical resource element and a discovery resource change cycle length, for example.

The base station may transmit information on second allocated resources for the D2D discovery and/or for the D2D communication in at least one physical resource element of first allocated resources for the D2D discovery and/or for the D2D communication. The UEs which perform D2D discovery and/or D2D communication may retrieve the information from the at least one physical resource element of the first allocated resources for the D2D discovery and/or for the D2D communication. However, additional signaling paths may additionally be used to convey information on the second allocated resources from the base station to the UEs. For illustration, additional information on the second allocated resources may be transmitted in a SIB message or by RRC signaling. This will be explained in more detail with reference to FIG. 14 and FIG. 15.

Figure 14:
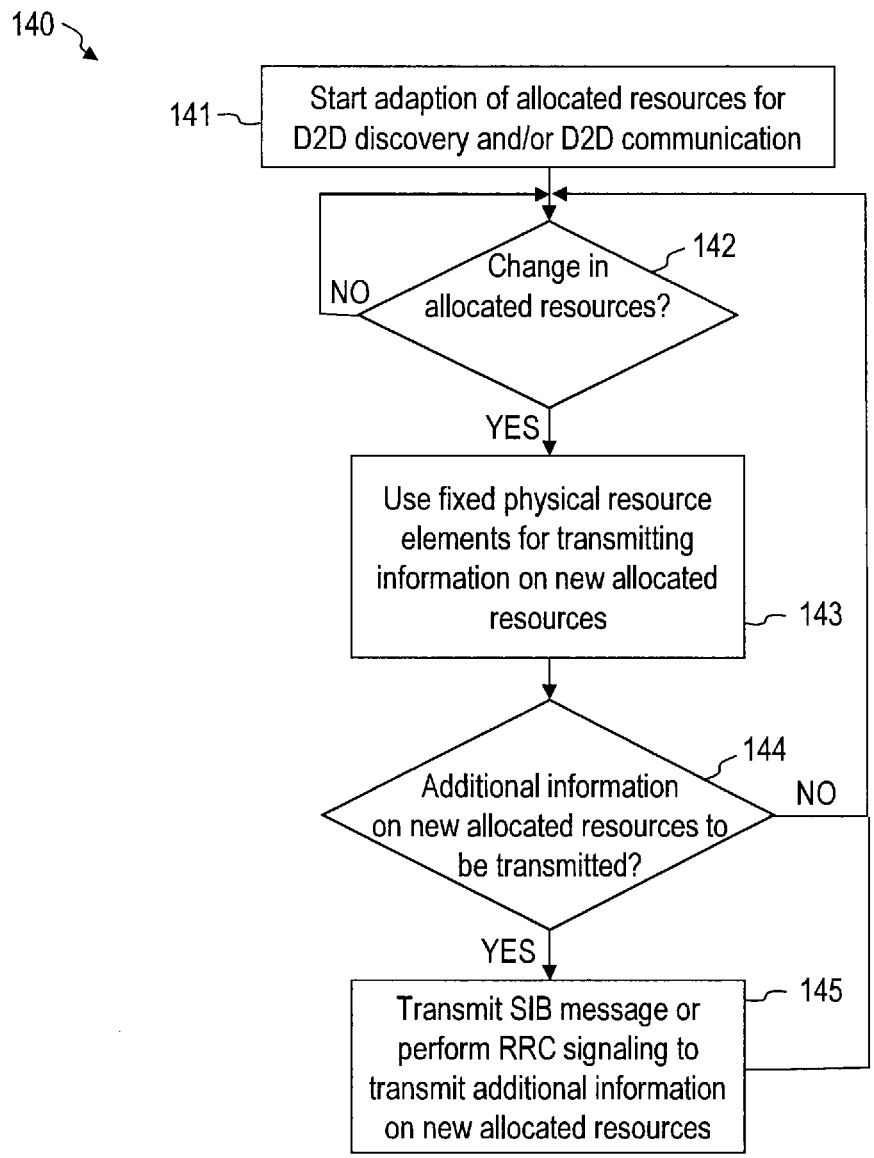
FIG. 14 is a flow chart of a method according to an embodiment.

FIG. 14 is a flow chart of a method 140 according to an embodiment. The method 140 may be performed by a base station according to an embodiment.

At 141, the base station may start an adaption of allocated resources for the D2D discovery and/or for the D2D communication. The adaption may be triggered by various events, e.g. a change in the number of UEs, the traffic in the uplink, traffic quality, or other parameters.

At 142, the base station determines whether the resources allocated for the D2D discovery and/or for the D2D communication need to be adapted. If the allocated resources do not need to be adapted, the monitoring at 142 may be continued. If it is determined that the allocated resources shall be adapted, the method may continue at step 143.

At 143, the base station may transmit information on new allocated resources which shall be used for the D2D discovery and/or for the D2D communication in the future in at least one fixed physical resource element of the allocated resources for the D2D discovery and/or for the D2D communication. The UEs may retrieve the information on the new allocated resources from the at least one fixed physical resource element of the allocated resources. The information may define a size of the new allocated resources. For illustration, the information may define a number of slots in the time domain and/or a number of subcarriers in the frequency domain which is respectively included in a discovery window of the new allocated resources for the D2D discovery and/or for the D2D communication.

At 144, the base station determines whether additional information on the new allocated resources is to be transmitted. The determining at 144 may include determining whether the allocation period is to be increased or decreased, for example. If the base station determines that no additional information on the new allocated resources is to be transmitted, the method may return to step 142. If the base station determines that additional information on the new allocated resources is to be transmitted, the method may continue at step 145.

At 145, the base station may transmit the additional information on the new allocated resources to the UEs. The base station may generate and transmit a SIB message or may perform RRC signaling to transmit the additional information.

By combining the transmission of additional information on the new allocated resources in a SIB message or in RRC signaling with the transmission of the information in physical resource elements of the presently active allocated resources for the D2D discovery and/or for the D2D communication, increased flexibility is attained. For illustration, parameters of the allocated resources which typically change more frequently, such as a size of the allocated resources in the time domain and/or frequency domain, may be transmitted in at least one physical resource element of the resources allocated for the D2D discovery and/or for the D2D communication. Other parameters of the allocated resources which typically change less frequently, such as an allocation period, may be transmitted in a SIB message, for example.

Figure 15:
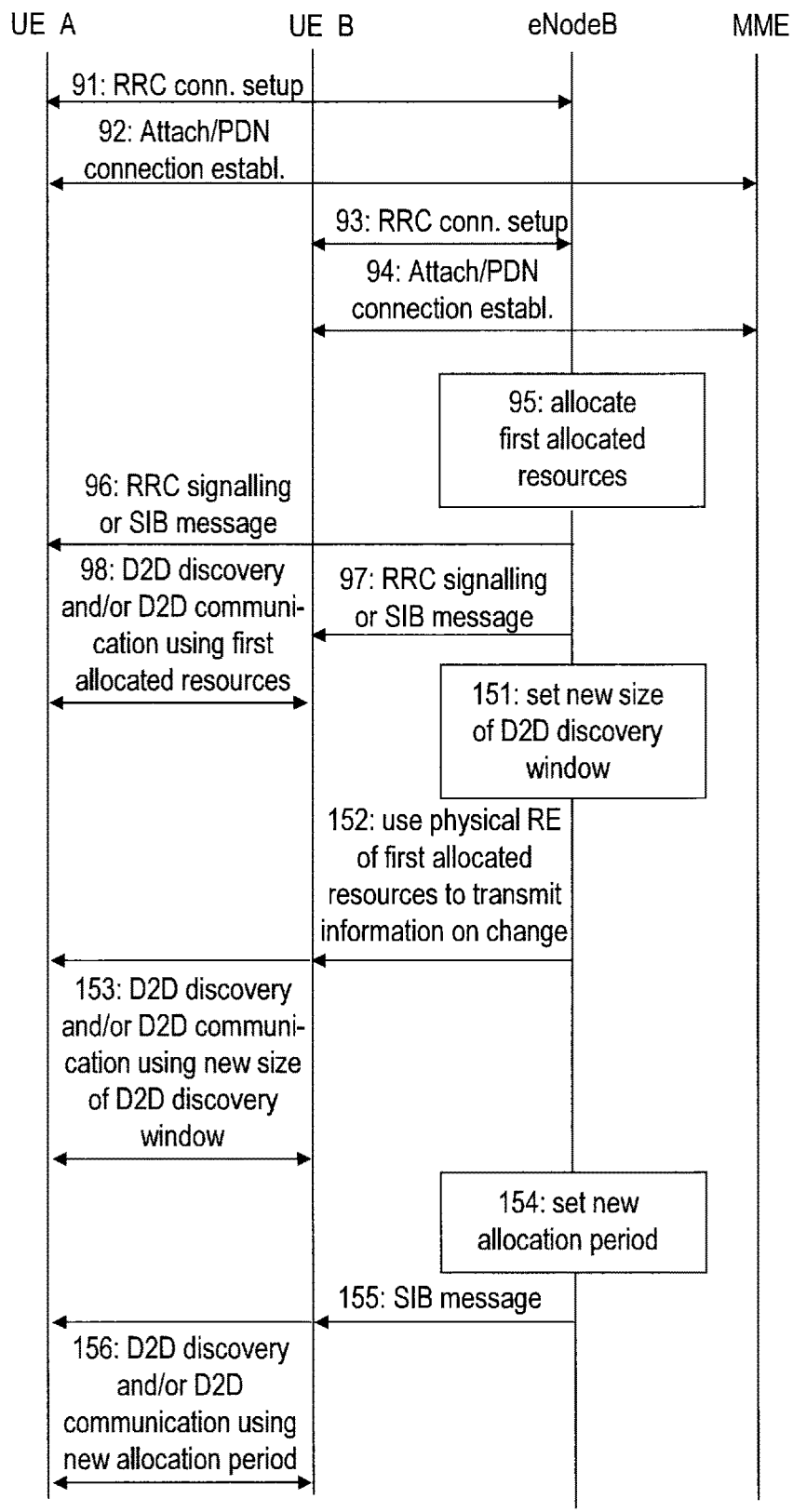
FIG. 15 is a diagram which illustrates signaling between a base station according to an embodiment and at least one user equipment according to an embodiment.

FIG. 15 illustrates the signaling in a system according to an embodiment. The connection establishment, allocation of first allocated resources and D2D discovery using the first allocated resources at 91 to 98 may be implemented as described with reference to FIG. 10.

At 151, the base station may determine that a new size of the D2D discovery window shall be used in the future. For illustration, the base station may determine that the size of the allocated resources for the D2D discovery and/or for the D2D communication shall be increased to accommodate an increasing need for D2D discovery and/or for the D2D communication. The base station may determine that the size of the allocated resources for the D2D discovery and/or for the D2D communication shall be decreased to accommodate the bandwidth requirements for uplink communication with the RAN.

At 152, the base station may transmit information on the new size of the discovery window in at least one physical resource element (RE) of the first allocated resources. The base station may thereby inform the first UE A and the second UE B of the new size of the discovery window. At 153, the first UE A and the second UE B may perform a D2D discovery using the new size of the discovery window, for example.

At 154, the base station may determine that a duration of the allocation period shall be decreased or increased. For illustration, the base station may decrease the duration of the allocation period when there are rapid fluctuations in the number of UEs within the coverage area and/or rapid changes in the uplink traffic. At 155, the base station may broadcast information on a new allocation period to the first UE A and the second UE B. The base station may broadcast the information on the new allocation period in a SIB message. At 156, the first UE A and the second UE B may perform a D2D discovery using the new allocation period.

It will be appreciated that the SIB message 155 does not need to be transmitted by the base station and processed by the UEs whenever there is a change in the allocated resources for the D2D discovery and/or for the D2D communication. The SIB message 155 may be transmitted selectively only when it is required to inform the UEs of a change in certain parameters, e.g. a duration of an allocation period. The transmission of the SIB message 155 may be reserved for cases which occur less frequently than a change in size of the allocated resources, for example.

Figure 16:
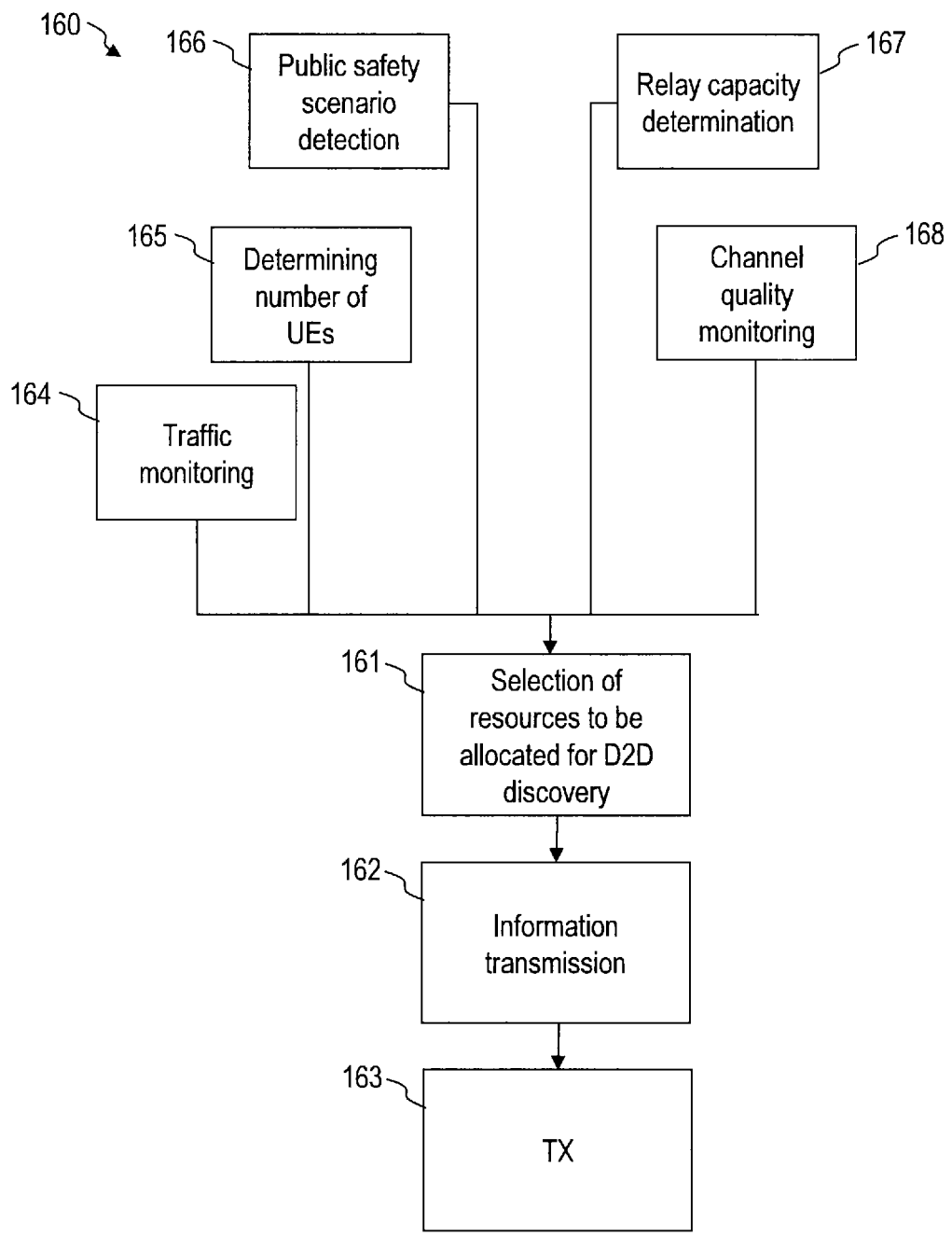
FIG. 16 is a functional block diagram representation of a base station according to an embodiment.

FIG. 16 is a functional block diagram of a base station according to an embodiment. The various functions may be performed by the control device 13 of the base station 11 according to an embodiment. Not all of the various functions need to be implemented in the base station according to an embodiment.

The control device 13 of the base station 11 may be configured to execute a resource selection function 161. The resource selection function 161 may be operative to determine parameters of the resources which will be allocated for the D2D discovery and/or for the D2D communication in the future. The resource selection function 161 may be configured to set the parameters of the resources which will be allocated for the D2D discovery and/or for the D2D communication based on any one or any combination of various input parameters. The resource selection function 161 may use traffic monitoring 164 which monitors at least uplink traffic. For increasing uplink traffic, the size of the discovery window may be decreased, for example. Alternatively or additionally, the resource selection function 161 may use a determination of the number of UEs 165. For increasing number of UEs which are not ProSe-enabled, the size of the discovery window may be decreased, for example. Alternatively or additionally, the resource selection function 161 may use a detection function 166 which detects a public safety scenario. For illustration, if an emergency call situation is detected, the size of the discovery window may be increased to ensure that a UE which places the emergency call has access to the D2D resources it may need. Alternatively or additionally, the resource selection function 161 may use a relay capacity determination 167 which detects whether UEs are capable of acting as relays for other UEs. The size of the discovery window may be increased to ensure that a UE can act as a repeater relay to temporarily increase the coverage area of a base station, for example. Alternatively or additionally, the resource selection function 161 may use a channel quality monitoring 168 which detects an indicator for uplink traffic on the RAN air interface. The size of the discovery window may be decreased if the channel quality is decreasing, for example, to ensure that the UEs may transmit voice or data communication to the RAN over the air interface.

The control device 13 of the base station 11 may be configured to execute an information transmission function 162 which selects the information on new allocated resources which is to be transmitted to the UEs.

The control device 13 of the base station 11 may be configured to execute a control function for a transmitter path 163 to ensure that information on the new allocated resources are transmitted at a frequency and/or at a transmit time which corresponds to the allocated resources for the D2D discovery and/or for the D2D communication that are presently in use.

In any one of the various embodiments, information on new resources allocated for D2D discovery and/or for the D2D communication may be transmitted by a base station, but also by a repeater relay or another user equipment in at least one physical resource element of the current allocated resources for the D2D discovery and/or for the D2D communication. This may be particularly useful when the other user equipment or repeater relay extends the coverage area of a base station, as will be explained in more detail with reference to FIG. 17.

Figure 17:
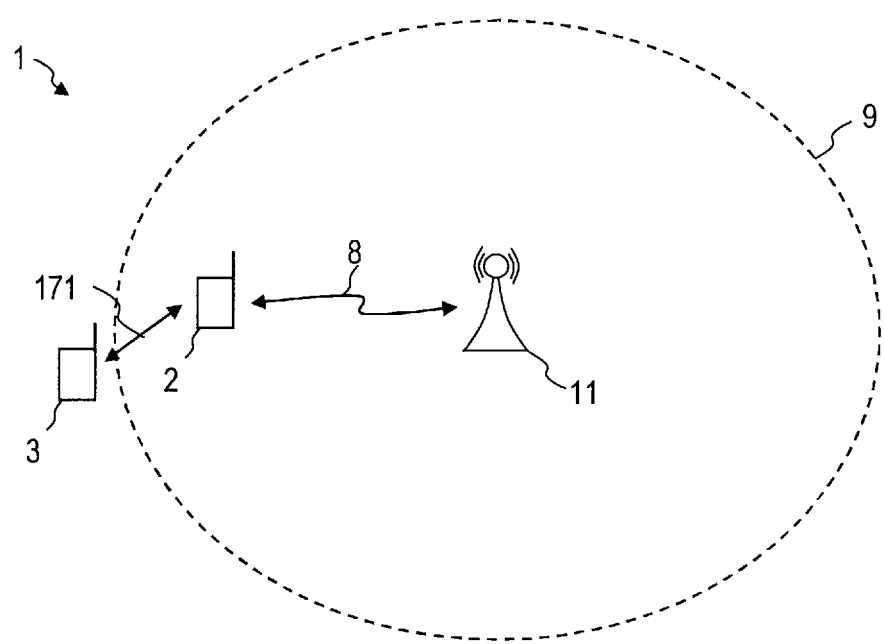
FIG. 17 shows a communication system according to another embodiment.

FIG. 17 shows a communication system 1 according to another embodiment in which information on the second allocated resources is transmitted to a UE 3 by another UE 2. In the illustrated embodiment, the UE 3 may be located outside of the coverage area 9 of the base station 11. The UE 3 and the other UE 2 may communicate with each other through D2D communication 171. In order to inform the UE 3 of a change of the resources allocated for the D2D discovery, the other UE 2 may transmit information on the second allocated resources in at least one physical resource element of the first allocated resources.

In any one of the various embodiments, information on new resources allocated for D2D discovery and/or for the D2D communication may be transmitted by a base station and may be received by a UE at a signal frequency and/or a transmit time which corresponds to the resources presently in use for the D2D discovery and/or for the D2D communication. The information on new, or second, allocated resources for the D2D discovery and/or for the D2D communication may include at least one parameter of the second allocated resources. Additionally or alternatively, information on a change in at least one parameter may be transmitted. For illustration, the information on the second allocated resources may define an increment or decrement in the size of a discovery window compared to the first allocated resources which are being used at the time at which the information on the second allocated resources is transmitted.

In any one of the various embodiments, the same resources may be allocated for both D2D discovery and D2D communication. However, different resources may also be used for the D2D discovery and a subsequent D2D communication. In this case, information on a change in the resources allocated for the D2D discovery may be included in at least one physical resource element of the resources allocated for the D2D discovery. Information on a change in the resources allocated for the D2D communication may be included in at least one physical resource element of the resources allocated for the D2D communication. Information on a change in the resources allocated for the D2D communication may additionally or alternatively also be included in at least one physical resource element of the resources allocated for the D2D discovery, for example.

In any one of the various embodiments, the transmission of the information on the second allocated resources may be implemented on the first layer of the Open Systems Interconnection (OSI) layer model, for example. Additional information on the second allocated resources my selectively be transmitted, e.g. to indicate a change in the allocation period. The signaling which is used to transmit the additional information on the second allocated resources may be implemented on the first layer, the second layer or the third layer of the OSI layer model, for example.

In any one of the various embodiments, the D2D discovery and/or for the D2D communication performed by a UE may include the transmission and/or reception of messages which takes place over the same interface with which the UE communicates with the RAN.

Modifications or alterations may be implemented in other embodiments. For illustration, a wide variety of different information elements which at least partially define the second allocated resources may be transmitted by the base station in the at least one physical resource element of the first allocated resources. Examples for such information elements include a size of a discovery window in the time domain and/or a size of a discovery window in the frequency domain, an increment in a size of a discovery window in the time domain and/or an increment in a size of a discovery window in the frequency domain, a decrement in a size of a discovery window in the time domain and/or a decrement in a size of a discovery window in the frequency domain, a time or frequency offset for a discovery window, a number of repetitions of a discovery window, etc.

Embodiments of the invention provide a signaling which allows a base station to inform UEs of a change in resources allocated for D2D discovery and/or for the D2D communication in an efficient way.

The invention claimed is:

1. A method of allocating resources for a device-to-device discovery and/or a device-to-device communication to at least one user equipment of a mobile communication network, the method comprising:
informing the at least one user equipment of a change of the resources allocated for the device-to-device discovery and/or for the device-to-device communication from first allocated resources to second allocated resources, said first and second allocated resources comprising a plurality of physical resource blocks, wherein each physical resource block includes a plurality of physical resource elements, said informing including
transmitting information on the second allocated resources in at least one physical resource element of the first allocated resources.

2. The method of claim 1,
wherein the at least one physical resource element has a fixed location in a physical resource block of the first allocated resources.

3. The method of claim 1,
wherein the first allocated resources are first allocated periodic resources, and wherein the second allocated resources are second allocated periodic resources.

4. The method of claim 3,
wherein the at least one physical resource element in which the information on the second allocated resources is transmitted has the same location in at least two physical resource blocks of the first allocated periodic resources.

5. The method of claim 4,
wherein one physical resource block of the at least two physical resource blocks and another physical resource block of the at least two physical resource blocks are transmitted time-sequentially.

6. The method of claim 4,
wherein the information on the second allocated resources is distributed over the at least two physical resource blocks.

7. The method of claim 4,
wherein the information on the second allocated resources is included several times in the at least two physical resource blocks.

8. The method of claim 1,
wherein the information on the second allocated resources determines a size of the second allocated resources.

9. The method of claim 1,
wherein the first allocated resources are used for a first allocation period, and
wherein the at least one user equipment starts using the second allocated resources for the device-to-device discovery and/or for the device-to-device communication upon expiry of the first allocation period.

10. The method of claim 1, further comprising:
transmitting additional information on the second allocated resources) in a system information block of a system information message.

11. The method of claim 10,
wherein the additional information on the second allocated resources includes a second allocation period for the second allocated resources.

12. A base station, comprising:
a wireless interface, and
a control device configured to control the wireless interface to allocate resources for a device-to-device discovery and/or a device-to-device communication to at least one user equipment of a mobile communication network,
wherein the control device is configured to inform the at least one user equipment of a change of the resources allocated for the device-to-device discovery and/or the device-to-device communication from first allocated resources to second allocated resources, said first and second allocated resources comprising a plurality of physical resource blocks, and each physical resource block includes a plurality of physical resource elements, the control device configured to inform the at least one user equipment by controlling the wireless interface to transmit information on the second allocated resources in at least one physical resource element of the first allocated resources.

13. The base station of claim 12,
wherein the control device is configured to control the wireless interface such that the at least one physical resource element has a fixed location in a physical resource block of the first allocated resources.

14. The base station of claim 13,
wherein the control device is configured to control the wireless interface such that the at least one physical resource element has a fixed time offset and/or a fixed frequency offset relative to a synchronization signal broadcast by the base station.

15. The base station of claim 12,
wherein the first allocated resources are first allocated periodic resources, and
wherein the second allocated resources are second allocated periodic resources.

16. The base station of claim 12,
wherein the control device is configured to control the wireless interface such that the at least one physical resource element in which the information on the second allocated resources is transmitted has the same location in at least two physical resource blocks of the first allocated periodic resources.

17. The base station of claim 12,
wherein the control device is configured to control the wireless interface such that the information on the second allocated resources determines a size of the second allocated resources.

18. The base station of claim 12,
wherein the base station is an eNodeB.

19. A user equipment, comprising:
a wireless interface for communication with a mobile communication network; and
a processing device coupled to the wireless interface and configured to:
control the wireless interface to perform a device-to-device discovery and/or a device-to-device communication using first allocated resources and second allocated resources, wherein said first and second allocated resources comprise a plurality of physical resource blocks, and each physical resource block includes a plurality of physical resource elements, and control the wireless interface to transmit information on the second allocated resources in at least one physical resource element of the first allocated resources to at least one further user equipment; and
monitor at least one physical resource element of the first allocated resources using the wireless interface to detect that resources allocated for the device-to-device discovery and/or for the device-to-device communication are changed from the first allocated resources to second allocated resources.

20. The user equipment of claim 19,
wherein the processing device is configured such that the at least one monitored physical resource element has a fixed location in a physical resource block of the first allocated resources.

21. The user equipment of claim 19,
wherein the first allocated resources are first allocated periodic resources, and
wherein the second allocated resources are second allocated periodic resources.

22. The user equipment of claim 21,
wherein the monitored at least one physical resource element has the same location in at least two physical resource blocks of the first allocated periodic resources.

23. The user equipment of claim 19,
wherein the processing device is configured to retrieve information included in the monitored at least one physical resource element to determine at least one parameter of the second allocated resources.

24. The user equipment of claim 23,
wherein the at least one parameter of the second allocated resources comprises a size of the second allocated resources.

25. The user equipment of claim 23,
wherein the processing device is configured to process a system information block of a system information message received by the wireless interface to determine at least one further parameter of the second allocated resources.

26. The user equipment of claim 19,
wherein the user equipment is configured to act as a controller for at least one further user equipment.

27. A mobile communication system, comprising:
a base station comprising,
a wireless interface, and
a control device configured to control the wireless interface to allocate resources for a device-to-device discovery and/or a device-to-device communication to at least one user equipment of a mobile communication network,
wherein the control device is configured to inform the at least one user equipment of a change of the resources allocated for the device-to-device discovery and/or the device-to-device communication from first allocated resources to second allocated resources, said first and second allocated resources comprising a plurality of physical resource blocks, and each physical resource block including a plurality of physical resource elements, the control device configured to inform the at least one user equipment by controlling the wireless interface to transmit information on the second allocated resources in at least one physical resource element of the first allocated resources, and
at least one user equipment according to claim 19.

28. A user equipment, comprising:
a wireless interface for communication with a mobile communication network; and
a processing device coupled to the wireless interface and configured to control the wireless interface to allocate resources for a device-to-device discovery and/or a device-to-device communication to at least one further user equipment of a mobile communication network,
wherein the processing device is configured to inform the at least one further user equipment of a change of the resources allocated for the device-to-device discovery and/or the device-to-device communication from first allocated resources to second allocated resources by controlling the wireless interface to transmit information on the second allocated resources in at least one physical resource element of the first allocated resources, said first and second allocated resources comprising a plurality of physical resource blocks, wherein each physical resource block including a plurality of physical resource elements.

* * * * *